US011603104B2

(12) United States Patent
Iwase et al.

(10) Patent No.: US 11,603,104 B2
(45) Date of Patent: Mar. 14, 2023

(54) DRIVER ABNORMALITY DETERMINATION SYSTEM, METHOD AND COMPUTER PROGRAM

(71) Applicant: Mazda Motor Corporation, Hiroshima (JP)

(72) Inventors: Koji Iwase, Aki-gun (JP); Makoto Yoshida, Aki-gun (JP); Junichiro Kuwahara, Aki-gun (JP); Yohei Iwashita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 168 days.

(21) Appl. No.: 17/198,278

(22) Filed: Mar. 11, 2021

(65) Prior Publication Data
US 2021/0316738 A1 Oct. 14, 2021

(30) Foreign Application Priority Data

Apr. 13, 2020 (JP) .............................. JP2020-071673

(51) Int. Cl.
*B60W 40/09* (2012.01)
*G01C 21/00* (2006.01)
(Continued)

(52) U.S. Cl.
CPC ........ *B60W 40/09* (2013.01); *B60W 50/0098* (2013.01); *G01C 21/3807* (2020.08); *G01C 21/3833* (2020.08); *G06V 20/58* (2022.01); *G06V 20/597* (2022.01); *B60W 2050/0026* (2013.01); *B60W 2420/42* (2013.01);
(Continued)

(58) Field of Classification Search
CPC ............ B60W 40/09; B60W 50/0098; B60W 2050/0026; B60W 2420/42; B60W 2420/52; B60W 2540/10; B60W 2540/12; B60W 2540/18; B60W 2540/223; B60W 2540/225; B60W 2554/4041;
(Continued)

(56) References Cited

U.S. PATENT DOCUMENTS 7,463,157 B2    12/2008  Victor et al.
2010/0063672 A1*  3/2010  Anderson ............ G05D 1/0246
                                            701/29.2
(Continued)

FOREIGN PATENT DOCUMENTS

JP      2010-128649 A    6/2010
JP         4711826 B2    6/2011
(Continued)

*Primary Examiner* — Frederick M Brushaber
*Assistant Examiner* — Harrison Heflin
(74) *Attorney, Agent, or Firm* — Xsensus LLP

(57) ABSTRACT

[Solution] A driver abnormality determination system includes circuitry configured to detect a driving operation of a driver, detect behavior of the driver's head and motion of eyeballs and/or movement of a sightline of the driver, recognize a driving scene in which the vehicle is driven; a memory that stores a sensor table of a relationship between the driving scene and detected values to be used to determine a driver abnormality; and determine the driver abnormality based on the sensor table, the driving scene, the driving operation and the behavior.

10 Claims, 26 Drawing Sheets

(51) Int. Cl.
*B60W 50/00* (2006.01)
*G06V 20/58* (2022.01)
*G06V 20/59* (2022.01)

(52) U.S. Cl.
CPC ..... *B60W 2420/52* (2013.01); *B60W 2540/10* (2013.01); *B60W 2540/12* (2013.01); *B60W 2540/18* (2013.01); *B60W 2540/223* (2020.02); *B60W 2540/225* (2020.02); *B60W 2554/4041* (2020.02)

(58) Field of Classification Search
CPC ............ G01C 21/3807; G01C 21/3833; G06V 20/58; G06V 20/597
See application file for complete search history.

(56) References Cited

U.S. PATENT DOCUMENTS

| | | | |
|---|---|---|---|
| 2020/0028876 A1 † | 1/2020 | Cohen | |
| 2021/0016805 A1 * | 1/2021 | Oba | G06T 3/00 |
| 2021/0387640 A1 * | 12/2021 | Tamori | B60W 60/0015 |
| 2021/0394775 A1 * | 12/2021 | Julian | G08G 1/164 |

FOREIGN PATENT DOCUMENTS

| | | | |
|---|---|---|---|
| JP | 2019-123434 A | | 7/2019 |
| WO | WO 2020-100584 A1 † | | 5/2020 |

\* cited by examiner
† cited by third party

FIG. 6A

| LARGE CATEGORY | MIDDLE CATEGORY | SMALL CATEGORY | PEDAL MODEL | | | | STEER MODEL | | | RISK PREDICTION MODEL | | | ROAD SHAPE PREDICTION MODEL | |
|---|---|---|---|---|---|---|---|---|---|---|---|---|---|---|
| | | | FB GAIN | DELAY | CONTROL PERFORMANCE | ESTIMATION ERROR | FB GAIN | TRAVEL POSITION | ESTIMATION ERROR | MAGNITUDE OF POTENTIAL RISK | MAGNITUDE OF VISIBLE RISK | DEVIATION FROM LOW-RISK STATE | PREDICTION CONTROL IN LATERAL DIRECTION | PREDICTION CONTROL IN VERTICAL DIRECTION |
| PREDICTIVE FUNCTION (HIGH-ORDER FUNCTION) | RISK PREDICTIVE FUNCTION | POTENTIAL RISK | | | | | | | | O | | O | | O |
| | | APPROACH TO VISIBLE RISK | | | | | | | | | O | O | | O |
| | | ROAD SHAPE | | | | | | | | | | O | O | |
| | ATTENTION FUNCTION | CONCENTRATION | | | | | | | | O | O | O | | O |
| | | ALLOCATION | | | | | | | | O | O | O | O | O |
| | | SPATIAL | | | | | O | | O | | | | O | |
| BASE FUNCTION (LOW-ORDER FUNCTION) | PERCEPTUAL FUNCTION | LATERAL DIRECTION | O | O | | | O | O | | | | | | |
| | | VERTICAL DIRECTION | | O | O | O | | | | | | | | |
| | MOTOR FUNCTION | HAND | | | O | O | | O | | | | | | |
| | | FOOT | O | O | | | | | | | | | | |
| INVOLUNTARY FUNCTION | MOTOR FUNCTION | HAND | | | | | O | | | | | | | |
| | | LEFT FOOT | | | | | | ... | | | | | | |

FIG. 6B

| LARGE CATEGORY | MIDDLE CATEGORY | SMALL CATEGORY | INDEX - SIGHTLINE |||||||||| INDEX - HEAD ||||| OTHER |
|---|---|---|---|---|---|---|---|---|---|---|---|---|---|---|---|---|---|
| | | | POINT TO BE LOOKED AT + SIGHTLINE | SALIENCY + SIGHTLINE || SIGHTLINE ||||||| PUPIL DIAMETER | HOMEOSTASIS (POSTURE KEEPING FUNCTION) |||| |
| | | | MATCHING DEGREE BETWEEN POINT TO BE LOOKED AT AND SIGHTLINE | SALIENCY AUC | SALIENCY | SACCADE AMPLITUDE | SACCADE FREQUENCY | SACCADE BILATERAL DIFFERENCE | SACCADE SPEED | SIGHTLINE DISTRIBUTION | MICRO-SACCADE | CYCLO-DUCTION | NYSTAGMUS | TEMPORAL CHANGE | AUTO-CORRELATION OF HEAD BEHAVIOR | CROSS-CORRELATION BETWEEN HEAD BEHAVIOR AND EXTERNAL FORCE | CROSS-CORRELATION BETWEEN HEAD BEHAVIOR AND SIGHTLINE | CROSS-CORRELATION WITH HAND/FOOT FUNCTION | ECCENTRICITY OF HEAD POSITION |
| PREDICTIVE FUNCTION (HIGH-ORDER FUNCTION) | RISK PREDICTIVE FUNCTION | VISIBLE RISK | | ○ | | ○ | | | | | | | | | | | | | |
| | | POTENTIAL RISK | | | ○ | | ○ | | | | | | | | | | | | |
| | ATTENTION FUNCTION | ATTENTION ALLOCATION (TOP-DOWN & BOTTOM-UP) | ○ | | | | | | | | | | | | | ○ | | | ○ |
| | | ATTENTION ALLOCATION (BOTTOM-UP) | | | ○ | | ○ | | | | | | | | | ○ | | | ○ |
| BASE FUNCTION (LOW-ORDER FUNCTION) | PERCEPTUAL FUNCTION | RANGE OF VISION | | | | | | | | | | | | | | | | | |
| | | COGNITIVE RESPONSE TIME | | | | | | ○ | | ○ | | | | | | | | | |
| | MOTOR FUNCTION | MOTION OF EYEBALLS | | | | | | ○ | | | | | | | | | | | |
| | | HAND - FOOT | | | | | | | | | | | | | | | ○ | ○ | |
| INVOLUNTARY FUNCTION | VESTIBULAR FUNCTION | VESTIBULO-OCULAR REFLEX | | | | | | | | | | | | | | | ○ | | |
| | | VESTIBULAR REFLEX | | | | | | | | | | | | | | | ○ | | |
| | MOTOR FUNCTION | MOTION OF EYEBALLS | | | | | | | | | | ○ | | ○ | | | | | |
| | | PUPILLARY REFLEX | | | | | | | | | | | | ○ | | | | | |
| | AUTONOMIC FUNCTION | SYMPATHETIC, PARASYMPATHETIC | | | | | | | | | ○ | | | | ○ | ○ | | | |

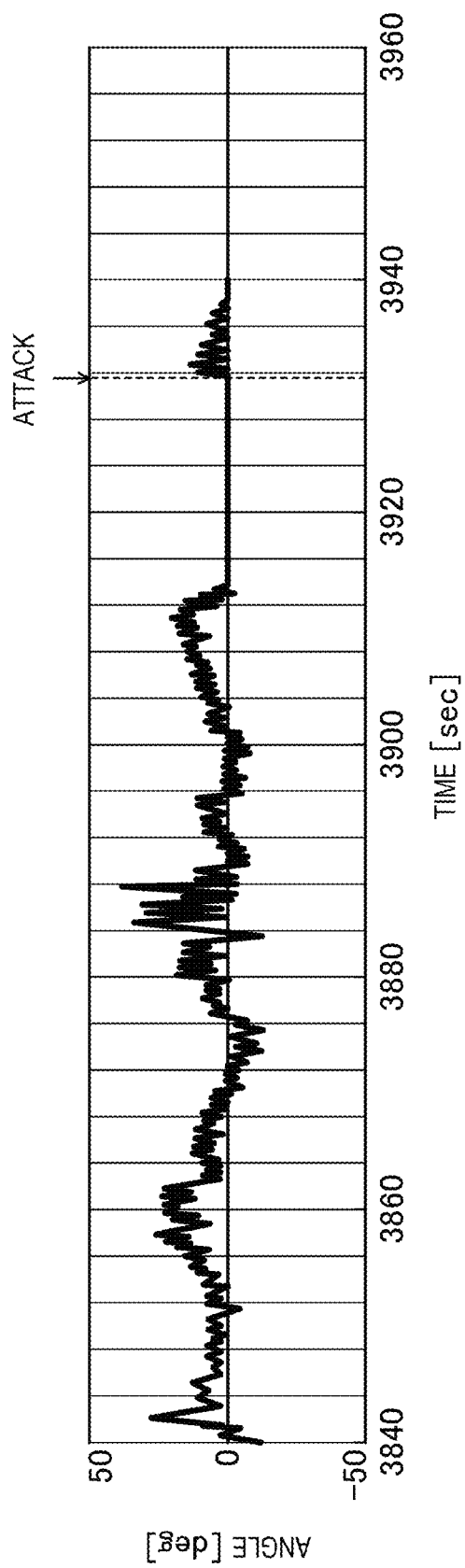

FIG. 14

| DRIVING SCENE | | ABNORMALITY DETERMINATION SENSOR | | | COMBINATION OF DETERMINATION |
|---|---|---|---|---|---|
| | | DRIVING OPERATION SENSOR | IN-VEHICLE CAMERA | | |
| | | | HEAD BEHAVIOR | SIGHTLINE BEHAVIOR | |
| STRAIGHT | CONSTANT SPEED | − (C1) | ○ | ○ | DETERMINE BY HEAD AND SIGHTLINE |
| | ACCELERATION/ DECELERATION | ○ | − (C3) | ○ | DETERMINE BY OPERATION AND SIGHTLINE |
| | FOLLOWING TRAVEL | ○ | ○ | ○ | DETERMINE BY OPERATION, HEAD, SIGHTLINE |
| | AVOIDANCE OF DANGER | ○ | − (C3) | − (C2) | DETERMINE BY OPERATION |
| CURVE | CONSTANT SPEED | ○ | − (C3) | ○ | DETERMINE BY OPERATION AND SIGHTLINE |
| | ACCELERATION/ DECELERATION | ○ | − (C3) | ○ | DETERMINE BY OPERATION AND SIGHTLINE |
| | FOLLOWING TRAVEL | ○ | − (C3) | − (C2) | DETERMINE BY OPERATION |
| | AVOIDANCE OF DANGER | ○ | − (C3) | ○ | DETERMINE BY OPERATION AND SIGHTLINE |
| LEFT/RIGHT TURN | | ○ | − (C3) | ○ | DETERMINE BY OPERATION AND SIGHTLINE |
| MERGING | | − (C1) | ○ | − (C1) | DETERMINE BY HEAD |

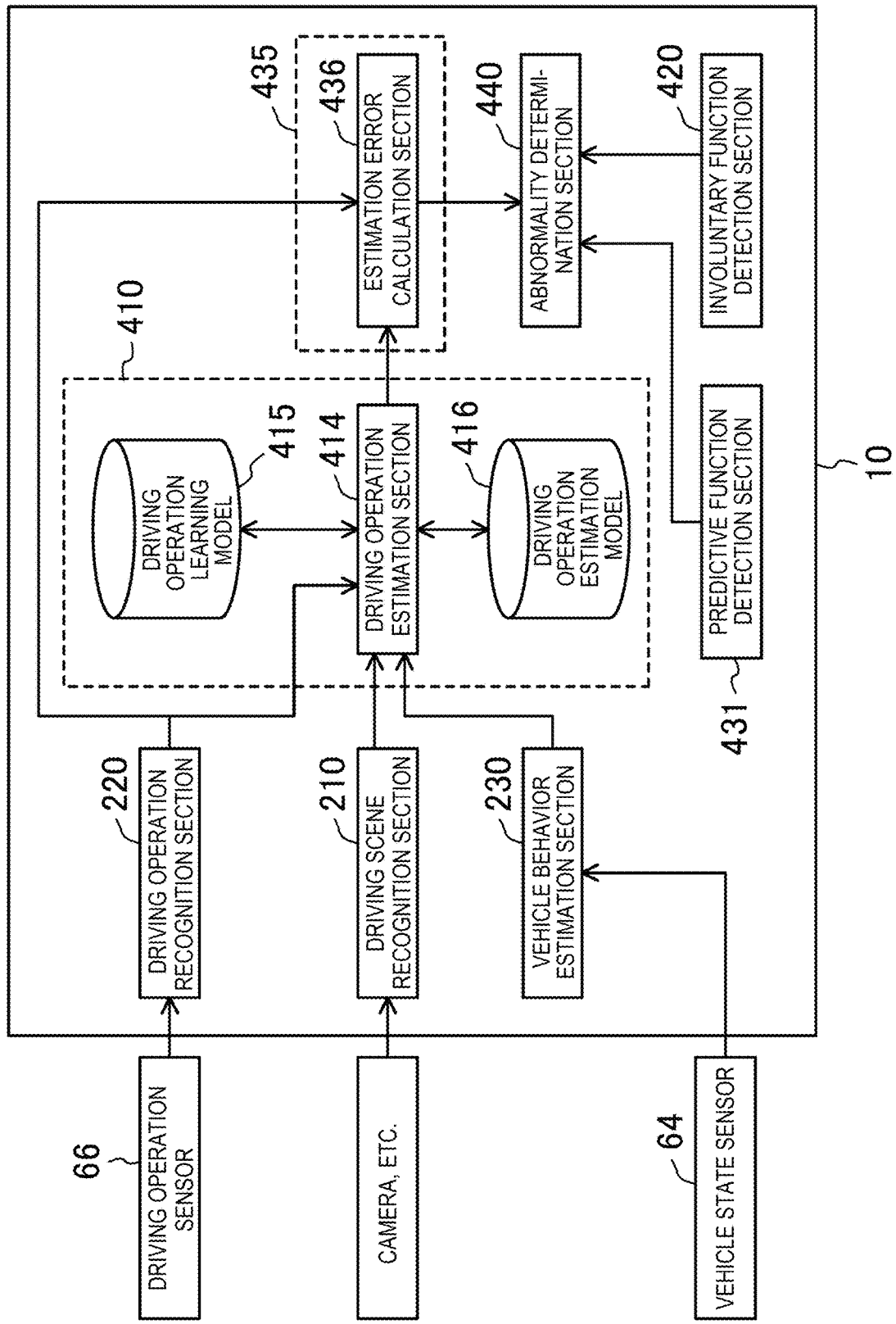

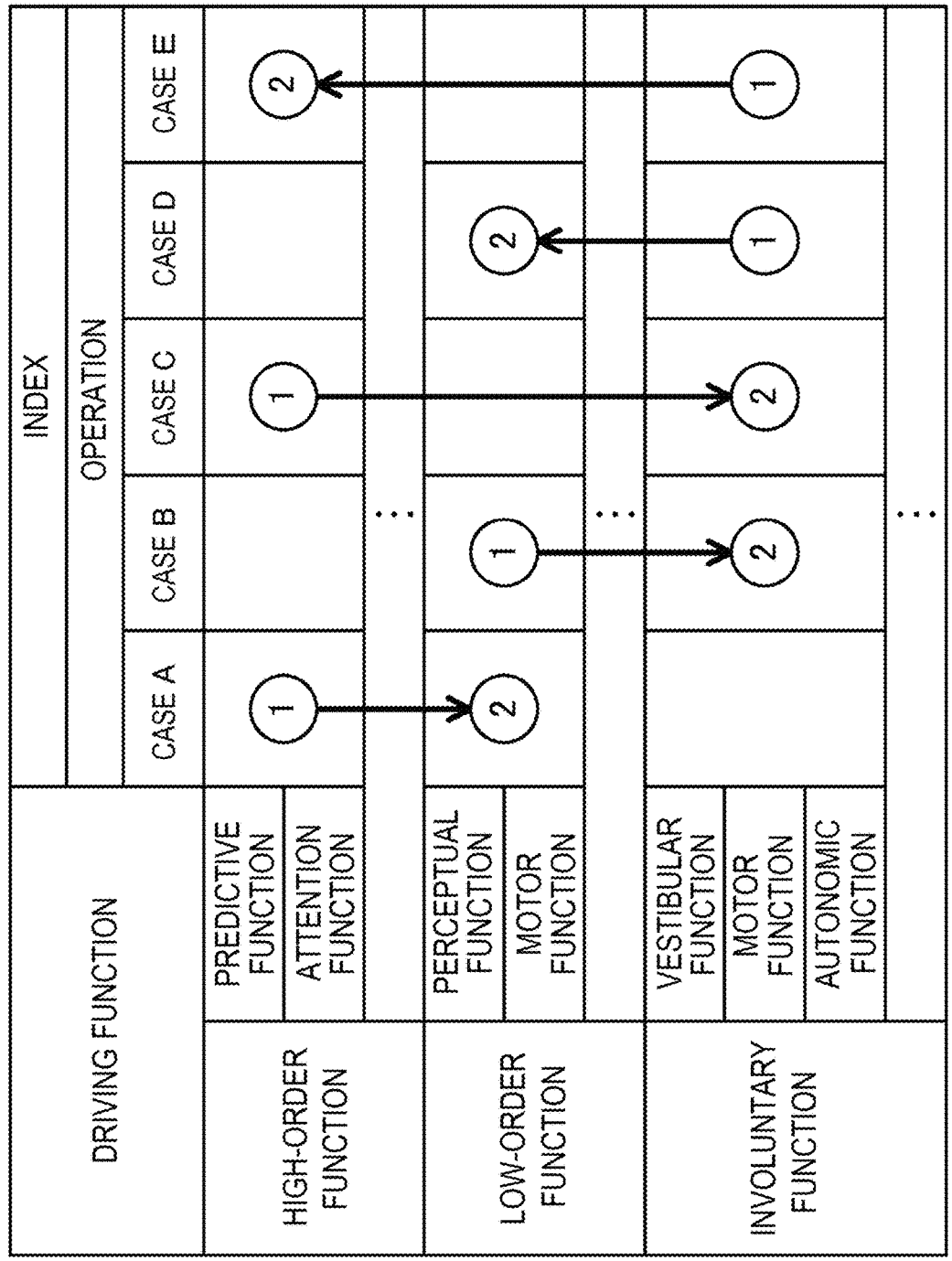

FIG. 24

| | | T11 | | T12 | | T13 | |
|---|---|---|---|---|---|---|---|
| | | CRITERION | DETERMINATION | CRITERION | DETERMINATION | CRITERION | DETERMINATION |
| INVOLUNTARY FUNCTION | PERIODICITY CHARACTERISTIC AMOUNT (HEAD BEHAVIOR) | LTH | ○ | LTH | ○ | LTH | ○ |
| | SACCADE AMPLITUDE (SIGHTLINE BEHAVIOR) | NORMAL AVERAGE RATE LESS THAN 50% | ○ | NORMAL AVERAGE RATE LESS THAN 50% | × | NORMAL AVERAGE RATE LESS THAN 50% | × |
| | ... | ... | | ... | | ... | |
| BASE FUNCTION | STEERING OPERATION DEVIATION DEGREE (DRIVING OPERATION) | ESTIMATION ERROR 0.4 deg OR LARGER | ○ | ESTIMATION ERROR 0.4 deg OR LARGER | ○ | ESTIMATION ERROR 0.35 deg OR LARGER | ○ |
| | ... | ... | | ... | | ... | |
| | SALIENCY INDEX (SIGHTLINE BEHAVIOR) | AREA OVER 0.6: X OR MORE | ○ | AREA OVER 0.6: X OR MORE | — | AREA OVER 0.6: X - α OR MORE | × |
| PREDICTIVE FUNCTION | DISTANCE FROM OBSTACLE (DRIVING OPERATION) | RISK VALUE Y OR HIGHER | ○ | RISK VALUE Y OR HIGHER | — | RISK VALUE Y OR HIGHER | ○ |
| | ... | ... | | ... | | ... | |
| | | | ○ | | ○ | | × |

DRIVER ABNORMALITY DETERMINATION SYSTEM, METHOD AND COMPUTER PROGRAM

CROSS-REFERENCE TO RELATED APPLICATIONS

The present application contains subject matter related to Japanese Priority Application 2020-071673, filed in the Japanese Patent Office on Apr. 13, 2020, the entire contents of which being incorporated herein by reference in its entirety. The application also contains subject matter related to that described in US application Ser. No. 17/198,265, and claiming priority to JP 2020-071670, and in U.S. application Ser. No. 17/198,271, and claiming priority to JP 2020-071672.

TECHNICAL FIELD

A technique disclosed herein relates to a driver abnormality determination system that determines abnormality of a driver who drives a vehicle (hereinafter simply referred to as a driver), for example.

BACKGROUND ART

As means for detecting driver abnormality, means that uses increased variations in a driving operation, a decline in accuracy of the driving operation, and biological information of a driver such as a driving posture, head behavior, and eyeball behavior of the driver has been known.

For example, in Patent document 1, a technique of detecting a sign of the driver abnormality based on an operation amount of an accelerator pedal at the time of detecting a preceding vehicle is disclosed. In Patent document 2, a technique of detecting an awakening state of the driver based on the head behavior of the driver that is detected in a monotonous segment, in which driving of a vehicle is monotonous, is disclosed. In Patent document 3, a technique of detecting the driver abnormality by detecting and evaluating head motion of a person and/or head motor reaction of the person with respect to an obstacle that influences an automobile is disclosed. In Non-Patent document 1, a case where the driver had a conscious disturbance attack while driving is discussed.

PRIOR ART DOCUMENTS

Patent Documents

[Patent document 1] JP-A-2019-123434
[Patent document 2] JP-A-2010-128649
[Patent document 3] Japanese Patent No. 4,711,826

Non-Patent Documents

[Non-Patent document 1] Kazuaki Shinohara and 7 others (November 2014) "Conscious disturbance attack while driving", Transactions of Society of Automotive Engineers of Japan, 45(6), pp. 1105-1110.
[Non-Patent document 2] T. Nakamura, et al., "Multiscale Analysis of Intensive Longitudinal Biomedical Signals and its Clinical Applications", Proceedings of the IEEE, Institute of Electrical and Electronics Engineers, 2016, vol. 104, pp. 242-261
[Non-Patent document 3] Mizuta et al. (2016) "Fractal time series analysis of postural stability", Equilibrium Research, Japan Society For Equilibrium Research, 75(3), pp. 154-161.

SUMMARY

Problems to be Solved

However, there is a problem that, in the case where the driver abnormality is detected based on the biological information of the driver that is acquired from output of various sensors mounted on the vehicle, a significant determination cannot be made in an actual driving scene of the vehicle. More specifically, for example, in the case where the driver abnormality is determined by detecting autonomous periodicity of head rocking motion during cornering of the vehicle, such a determination is noisy and unpractical. As a result, depending on the driving scene, there is a case where the driver abnormality can be detected with a high degree of accuracy, and there is a case where the driver abnormality cannot be detected with the high degree of accuracy.

A technique disclosed herein has been made in view of such a point and therefore has a purpose of determining driver abnormality with a high degree of accuracy even when a driving scene is changed.

One or more embodiments herein is directed to a driver abnormality determination system that determines abnormality of a driver who drives a vehicle. The driver abnormality determination system includes circuitry configured to detect a driving operation by the driver, detect behavior of the driver's head and motion of eyeballs and/or movement of a sightline of the driver, and recognize a driving scene in which the vehicle is driven. A memory stores a sensor table of a relationship between the driving scene of the vehicle and detected values to be used to determine a driver abnormality. The circuitry is configured to determine the driver abnormality based on the sensor table, the driving operation, the behavior, and the driving scene.

With such a configuration, a predetermined body target part of the driver is selected in accordance with the driving scene, and the driver abnormality determination can be made based on detection data on the target part. For example, as the body target part at this time, a part without a large number of elements that possibly become noise is selected per driving scene. In this way, even when the driving scene changes, the abnormality or a sign of the abnormality of the driver (hereinafter collectively referred to as driver abnormality) can be determined with a high degree of accuracy.

As it has been described so far, according to the technique disclosed herein, it is possible to simultaneously determine the driver abnormality early and improve the accuracy of the abnormality determination.

BRIEF DESCRIPTION OF THE DRAWINGS

FIG. 6A is a table illustrating relationships between measurement indices and driving functions.

FIG. 6B is a table illustrating relationships between measurement indices and the driving functions.

FIG. 13 is a graph illustrating movement of a sightline when an epilepsy patient has an attack.

FIG. 14 is a table in which each of assessable indices is linked with a driving scene.

FIG. 15 is a block diagram for illustrating detecting operation in a base function level.

FIG. 17 is a view for illustrating development orders of the illness.

FIG. 24 is a table illustrating an example of determination criteria used to determine the driver abnormality and determination results.

DETAILED DESCRIPTION

Overview

Figure 1:
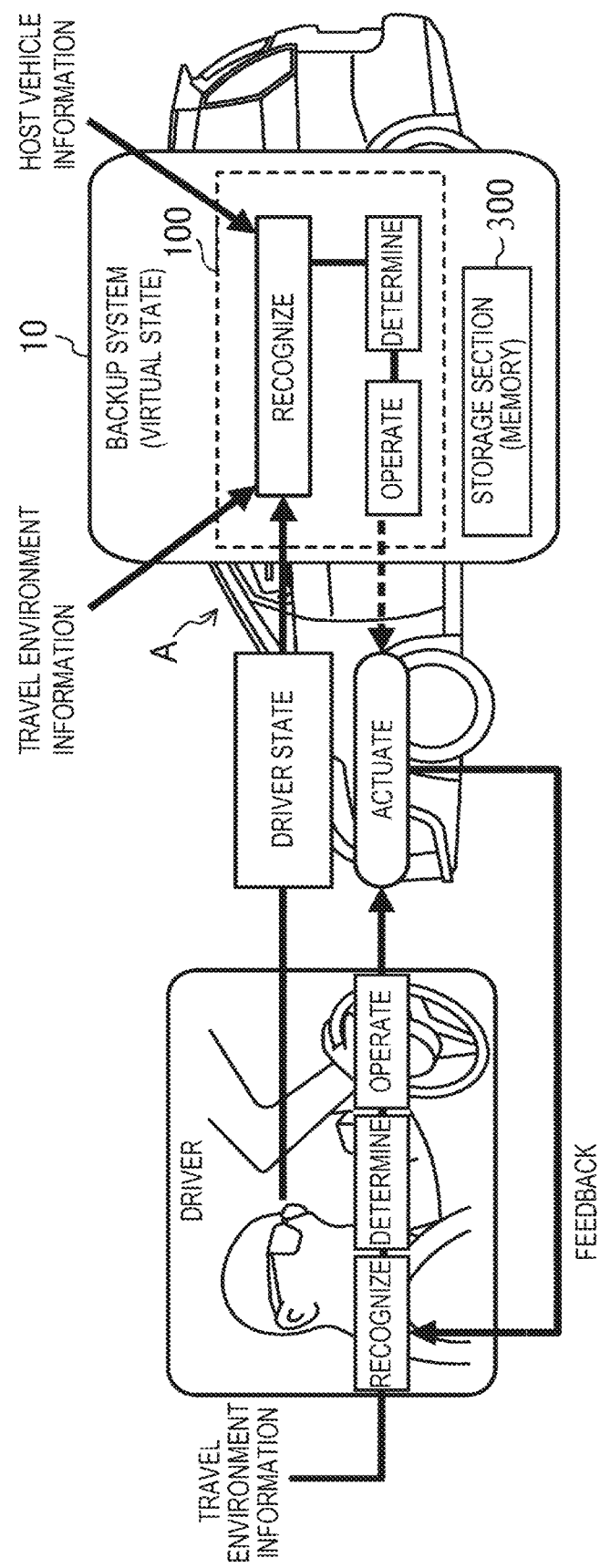
FIG. 1 is a conceptual view for illustrating a driver-led automated driving system.

As illustrated in FIG. 1, regarding a vehicle A on which a driver-led automated driving system is mounted, normally (in a normal state), a driver drives the vehicle A while the automated driving system comprehends states of a host vehicle, external environment, and the driver to perform virtual driving behind the driver. In other words, the automated driving system is operated as a backup system. The automated driving system recognizes travel environment information in a similar manner to the driver, and also recognizes a state of host vehicle information and the driver state. In parallel with driving by the driver, the automated driving system determines how to move the vehicle A based on the above recognition results, and decides target motion of the vehicle A. When determining that the driver suffers from dysfunction or an illness, the automated driving system operates the host vehicle instead of the driver to ensure safety of surrounding, and also complements a declined function of the driver among functions such as recognition, determination, and an operation.

The driver-led automated driving system is designed with the operation as described above as a precondition. Thus, it is extremely important to discover occurrence of abnormality such as the declined function, the dysfunction, or the illness to the driver (hereinafter referred to as driver abnormality) as soon as possible and with a high degree of accuracy.

The driver state is largely categorized into a normal healthy state and an abnormal state where the driver suffers from the dysfunction or the illness. The normal state includes, in a descending order of a degree of awareness, a flow state where the driver concentrates on driving at a maximum, a concentrated driving state, a relaxed driving state, an inattentive driving state, a desultory driving state, a declined awakening state, and a drowsy state. As for the illness, various illnesses exist. Based on the knowledge discussed in Non-Patent document 1, representative examples of the illness that shows a clear sign of a conscious disturbance attack while driving are epilepsy, apoplexy, myocardial infarction, and hypoglycemia.

Figure 2:
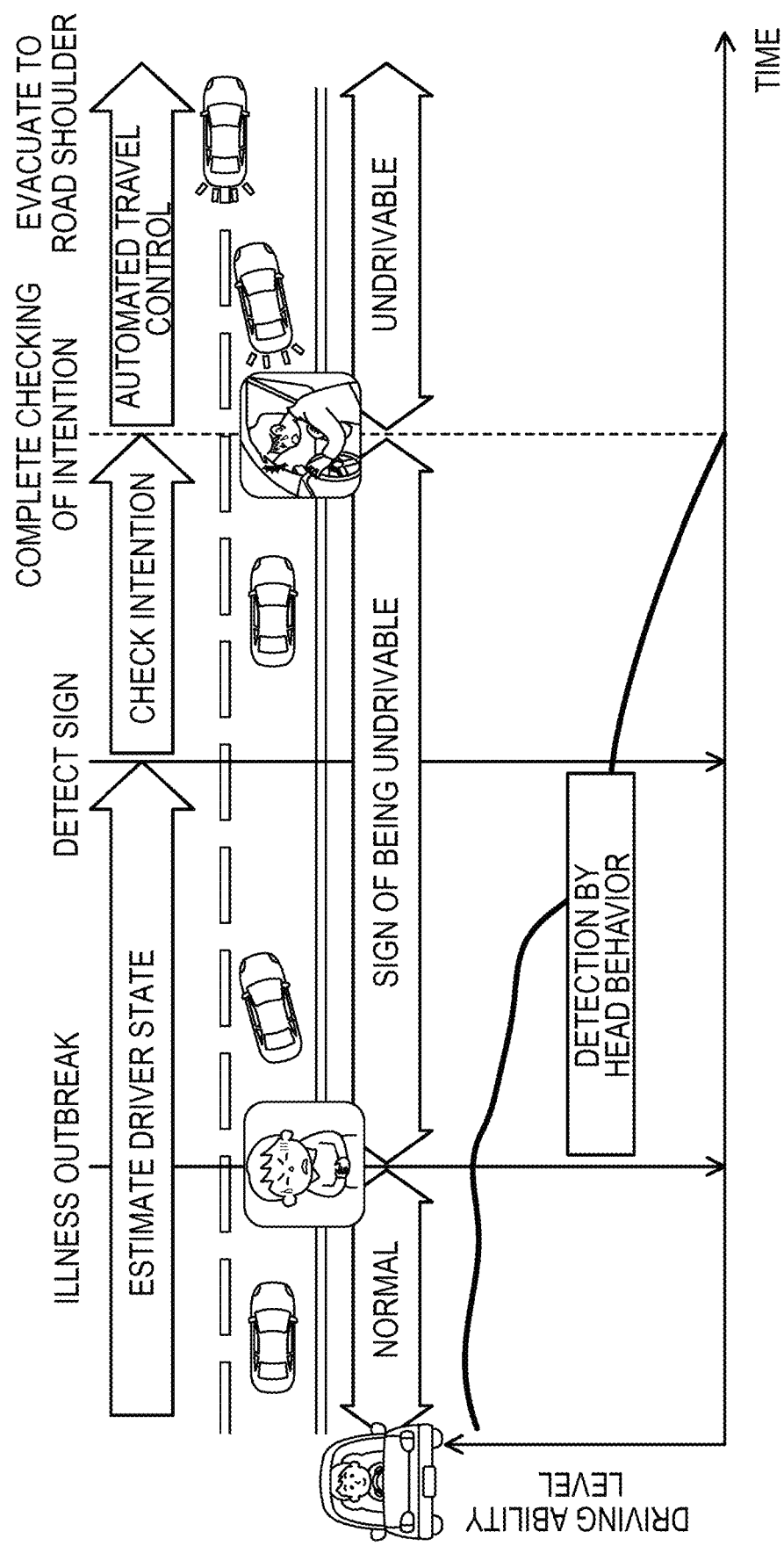
FIG. 2 is a conceptual view illustrating an orientation of a technique that relates to the present disclosure.

The inventors determined that a state change of the driver from the normal state (the healthy state) to an undrivable state due to an outbreak of the illness, which resulted in the conscious disturbance attack, was categorized into three patterns. A case A is a pattern in which one or some of functions including perception, determination, and mobility are declined first. A case B is a pattern in which all the functions are gradually declined. A case C is a pattern in which the driver suddenly loses consciousness. Of these, in the cases A, B, as illustrated in FIG. 2, a driving ability level of the driver is gradually declined since the outbreak of the illness, and the driver is eventually brought into the undrivable state. Accordingly, in the case where this declined state of the driving ability can be detected, it is possible to detect a sign of the undrivable state of the driver.

It can be said for all of the three cases A to C that, currently, the outbreak of the illness can be recognized only after the driver is brought into the undrivable state. This is because it is difficult to determine whether the driver is in a state of being healthy but desultory, a state with accumulated fatigue, or a state of suffering from the illness. In addition, even in the healthy state of the driver, it is normal for the driver to close his/her eyes and relax his/her posture. Thus, the driver abnormality must be determined under a condition that abnormal action satisfying a specified condition continues for certain duration. That is, the related art has problems for accurate determination that it takes time for the determination when it is attempted to improve the degree of accuracy of discovery of the illness and that a frequency of an erroneous determination of the illness is increased when it is attempted to reduce the time required for the determination of the illness. In addition, as described above, depending on a driving scene, there is a case where the driver abnormality can be detected with the high degree of accuracy, and there is a case where the driver abnormality cannot be detected with the high degree of accuracy. Furthermore, the driving scene of the vehicle changes from moment to moment. Thus, there is a problem that, in the case where it takes a certain time to discover the illness of the driver, the driving scene does not always stay the same for the certain time. In view of such a problem, the inventors found a method for determining the driver abnormality with the high degree of accuracy even when the driving scene changed.

Determination of Driver Abnormality

<Classification by Driver's Function>

In general, as a method for determining the driver abnormality, that is, a method for determining that the driving ability level is declined and the driver is brought into the undrivable state, a technique of detecting occurrence of abnormality to a function that is established regardless of the driver's intention, a so-called involuntary function has been known. As a method for detecting the abnormality of the involuntary function, for example, there is a method for determining the illness of the driver by analyzing an unbalanced driving posture of the driver and an eye-opening amount of the driver based on a video captured by an imaging section.

Examples of the involuntary function are motor functions of hands and feet, motor functions of a head and eyeballs, an autonomic function such as reaction of an autonomic nerve, and a vestibular function.

When a brain function is focused, in contrast to the involuntary function, a voluntary function that is a voluntary function of a person exists. A voluntary function of the driver that is associated with driving will herein be referred to as a "driving function". Recently, various techniques of detecting this driving function have been developed.

The inventors of the present application investigated classification of this driving function by focusing on the brain functions. More specifically, the inventors of the present application classified the driving function into: a base function that was a relatively low-order function (hereinafter also referred to as a low-order function); and a predictive function that was a relatively high-order function (hereinafter referred to as a high-order function).

The base function is the driving function that serves as a base (basis or a foundation) of a driving operation, and is the driving function that is processed in a near unconscious region. Examples of the base function are perceptual functions of a position and motion, a range of vision, the motor functions of the hands and the feet, the motor functions of the head and the eyeballs, and a function associated with spatial recognition. More specifically, examples of the base function are the driving function of making the vehicle travel along a lane, the driving function of making the vehicle travel while keeping an inter-vehicular distance with a preceding vehicle, and the driving function of making the vehicle stop in front of a red light or a crosswalk.

The predictive function is a function of predicting a future driving scene, and is the driving function that has an impact on whether so-called "driving while assuming oo might happen" can be performed. Examples of the predictive function are a risk predictive function of predicting a risk during driving, a determination function associated with driving action, and an attention function during driving. The risk predictive function includes a function of predicting a potential risk, a function of predicting approach of a visible risk, a function of predicting a risk that is based on travel environment such as a road shape, and the like. The attention function during driving includes a function of concentrating on a matter to be concentrated, a function of appropriately allocating the attention, a spatial attention function, and the like.

Figure 3:
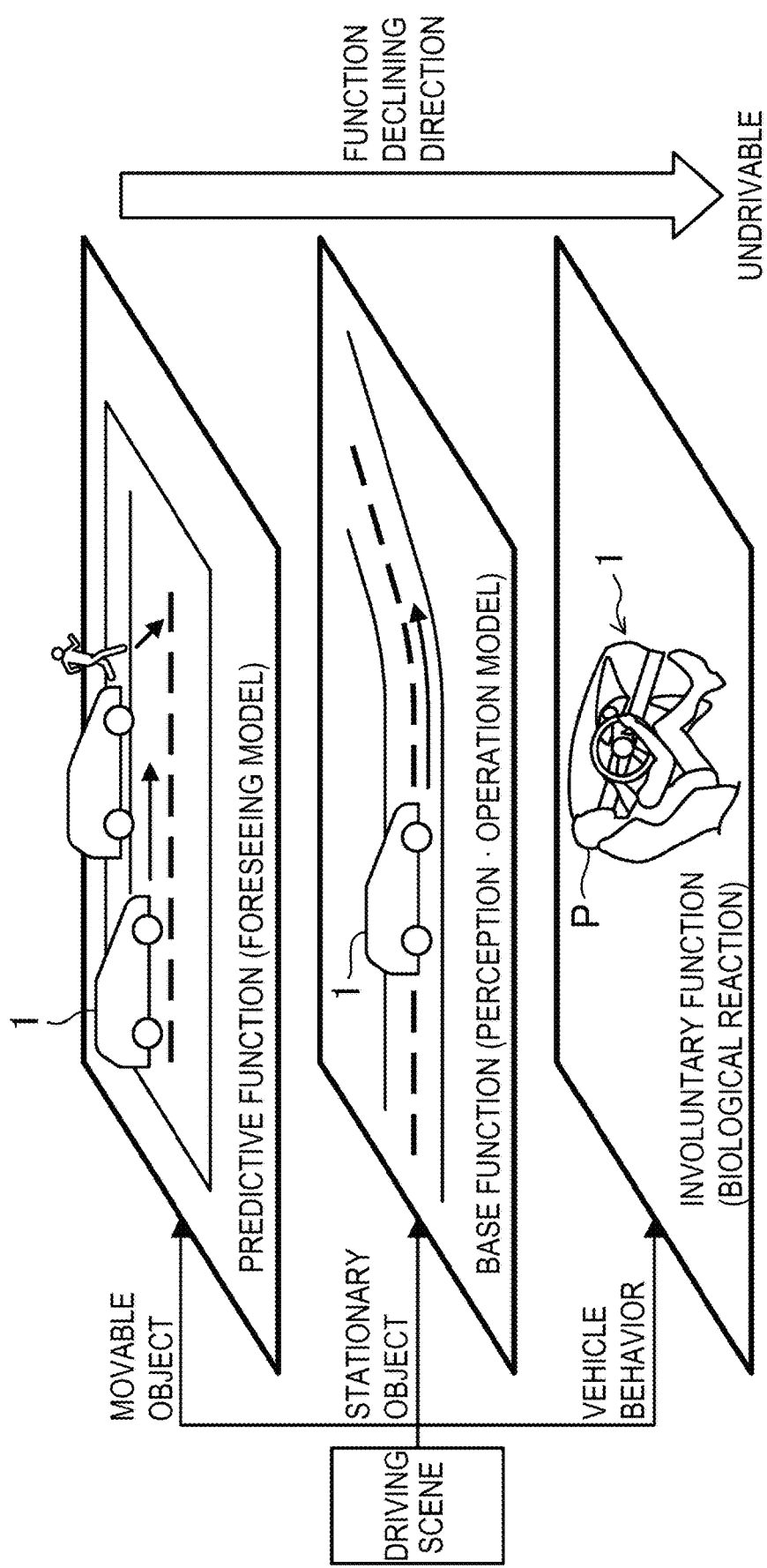
FIG. 3 is a view for illustrating stratification of driving action by a driver.

When what has been described so far is summarized, as illustrated in FIG. 3, the inventors investigated to divide the driving action by the driver into three strata of involuntary action with which the above-described involuntary function was executed, base action with which the base function was executed, and predictive action with which the predictive function was executed. Then, the inventors investigated to determine the driver abnormality by using an involuntary function level indicative of a degree of proper execution of the involuntary function, a base function level indicative of a degree of proper execution of the base function, and a predictive function level indicative of a degree of proper execution of the predictive function. As a specific method, the execution conducted travel tests on a healthy person and a sick person by using a driving simulator 70 (see FIG. 20) to change the driving scene and a driving situation. Then, the inventors analyzed the results. As a result, the inventors obtained such knowledge that, in the case where the driver suffered from the illness, the function related to the high-order action started being declined first, and thereafter, a decline in the function related to the base action and a decline in the function related to the involuntary action sequentially occurred.

Furthermore, to improve the accuracy of the determination of the driver abnormality the involuntary function level, the base function level, and/or the predictive function level may be combined to determine the driver abnormality. As a result, the inventors obtained such knowledge that, in the case where the functions as the basis of the driving ability were classified into the involuntary function, the low-order function, and the high-order function, there were a case where each of such functions was suited for the detection of the driver abnormality and a case where each of such functions was not suited for the detection of the driver abnormality according to the driving scene of the vehicle (including a traffic condition). That is, the inventors found that the driver abnormality could be determined early and the degree of the accuracy thereof could be improved by focusing on a relationship between the vehicle driving scene and suited timing for detection of the abnormality of each of the above functions when the involuntary function level, the base function level, and/or the predictive function level were combined.

<Combination of Detection of Functions>

Figure 4:
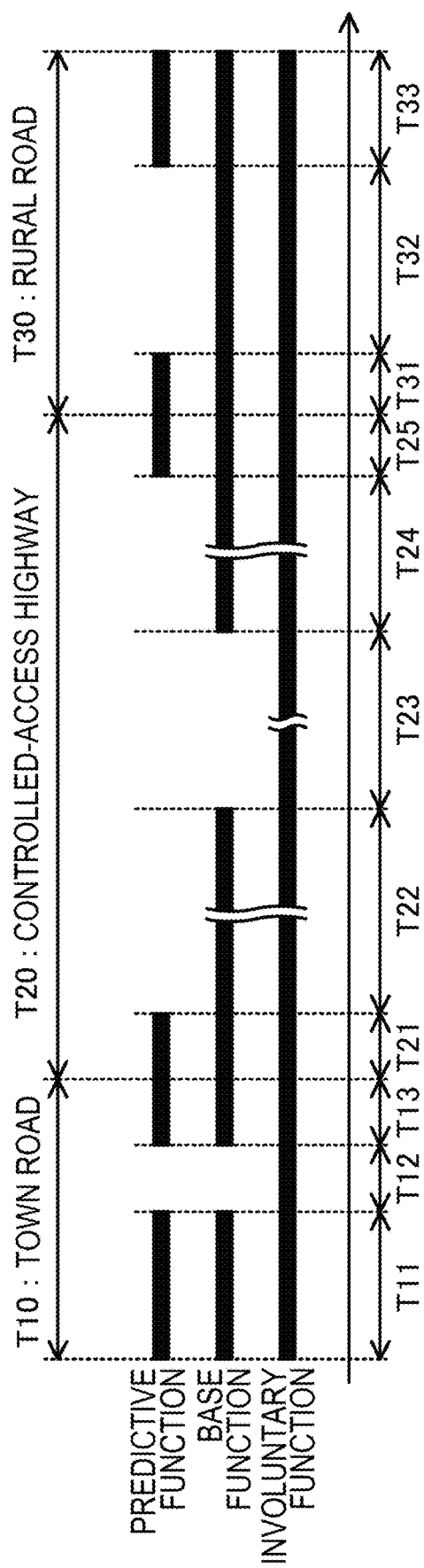
FIG. 4 is a chart illustrating timing at which each function of the driver during driving can be determined.

FIG. 4 is a chart illustrating an example of suited timing for the determination of each of the functions, which are the predictive function, the base function, and the involuntary function, per driving scene.

In FIG. 4, in the driving scene in a period T10 (including T11 to T13), the vehicle A (the host vehicle) travels on a town road on which a pedestrian, a parked vehicle, and the like exist. It is assumed that the vehicle travels on the town road at a specified speed in the periods T11, T13 and that the vehicle stops at a signal, a crosswalk, or the like in the period T12. In the present disclosure, the "driving scene" means a scene in which the vehicle is driven. More specifically, the term "driving scene" is used as a concept that includes, in addition to a travel scene of the vehicle, a scene where the vehicle stops for a specified time at a stop sign, the signal, or the like.

Since the vehicle A travels on the town road in the periods T11, T13, the vehicle A is in a situation where the predictive function must be executed in order to avoid the parked vehicle, to predict running of the pedestrian into the road, and the like. The vehicle A is also in a situation where the base function must be exerted in order to keep the constant inter-vehicular distance with the preceding vehicle, to travel along the lane at a curve, and the like. Furthermore, the involuntary function must be executed to keep looking forward, keep a driving posture, and the like. That is, in the periods T11, T13, the vehicle A is in a situation where the involuntary function, the base function, and the predictive function must be executed, and such a situation corresponds to the driving scene that is suited for detection of the driver abnormality or a sign of the driver abnormality (hereinafter collectively and simply referred to as the "driver abnormality") associated with the involuntary function, the base function, and the predictive function. Accordingly, in a driving scene as that in the periods T11, T13, an abnormality determination apparatus determines the driver abnormality by checking results of the function levels of the driver and a combination thereof with a specified condition or criterion. The function levels of the driver are detected by (1) an involuntary function detection section that detects the involuntary function level, (2) a predictive function detection section that detects the predictive function level, and (3) a base function detection section that detects the base function level. The involuntary function detection section, the predictive function detection section, and the base function detection section will be described below in an embodiment.

Since the vehicle A stops in the period T12, the involuntary function must be executed. Meanwhile, there are many situations where the base function and the predictive function do not have to be executed. In such a case, significant data may not be acquired even when executed statuses of the base function and the predictive function with respect to the driver's action are detected, and the insignificant data thereon possibly becomes noise in estimation of the driver abnormality. Thus, in the driving scene as that in the period T12, the abnormality determination apparatus determines the driver abnormality based on the detection result by the involuntary function detection section.

In the driving scene in a period T20 (including T21 to T25), the vehicle A (the host vehicle) travels on a limited highway with no signals such as a controlled-access highway or a toll road (described as "CONTROLLED-ACCESS HIGHWAY" in FIG. 4). For example, it is assumed that the period T21 represents a period from time at which the vehicle A arrives at a toll booth to time at which the vehicle A merges into a travel lane, the periods T22 to 124 represent periods in each of which the vehicle A travels on the travel lane, and the period T25 represents a period from time at which the vehicle A enters a frontage road from the travel lane to time at which the vehicle A leaves the toll booth. In addition, it is assumed that the period T23 corresponds to such a driving scene that no vehicle is present around the host vehicle and the host vehicle travels on a long straight road. That is, it is assumed that the period T23 corresponds to a situation where the driver hardly has to care about a surrounding situation and only needs to drive the vehicle straight.

The periods T21, T25 each correspond to a situation where the predictive function must be executed to predict a risk of the approach of the vehicle from the right or the left at the toll booth, to predict a risk related to behavior of another vehicle during merging, and the like. In addition, the periods T21, T25 each correspond to a situation where the base function must be executed to keep the constant inter-vehicular distance with the preceding vehicle and to travel along the lane at the curve. Furthermore, the periods T21, T25 each correspond to a situation where the involuntary function must be executed to keep looking forward, keep the driving posture, and the like. That is, the periods T21, T25 each correspond to a situation where the involuntary function, the base function, and the predictive function must be executed and to a driving scene that is suited for the detection of the abnormality of the involuntary function, the base function, and the predictive function. Accordingly, in the driving scene as that in the periods T21, T25, similar to the case in T11, the abnormality determination apparatus determines the driver abnormality by checking the results of the function levels of the driver, which are detected by the involuntary function detection section, the predictive function detection section, and the base function detection section, and the combination thereof with the specified condition or criterion.

The periods T22, 124 each correspond to a situation where the base function must be executed to keep the constant inter-vehicular distance with the preceding vehicle, to travel along the lane at the curve, and the like. In addition, the periods T22, 124 each correspond to a situation where the involuntary function must be executed to keep looking forward, keep the driving posture, and the like. Meanwhile, such a situation possibly arises where the predictive functions including the risk predictive function and the attention function do not have to be executed when a distance from another peripheral vehicle is long or when the vehicle A travels solo. In such a driving scene, the significant data may not be acquired even when the execution status of the predictive function of the driver is detected, and the insignificant data thereon possibly becomes the noise in the estimation of the driver abnormality. Accordingly, in the driving scene as that in the periods T22, 124, such a situation arises that at least the involuntary function and the base function must be executed. Thus, the abnormality determination apparatus determines that the involuntary function and the base function are suited for the detection of the abnormality thereof, and determines the driver abnormality by checking the results of the function levels of the driver, which are detected by the involuntary function detection section and the base function detection section, and the combination thereof with the specified condition or criterion.

The period T23 corresponds to a situation where the base function must be executed for the vehicle A to travel along the lane. However, even in a situation where the base function is not sufficiently executed, such a situation is less likely to impact on the travel of the vehicle A. In other words, in the driving scene such as that in the period T23, the driver does not have to execute the base function sufficiently. Accordingly, in such a driving scene, the significant data may not be acquired even when the execution status of the base function with respect to the driver's action is detected, and the insignificant data thereon possibly becomes the noise in the estimation of the driver abnormality. The same applies to the predictive function. Accordingly, in the driving scene as that in the period T23, such a situation arises that at least the involuntary function must be executed. Thus, the abnormality determination apparatus determines that the involuntary function is suited for the detection of the abnormality thereof, and determines the driver abnormality based on the detection result by the involuntary function detection section.

In the driving scene in a period T30 (including T31 to T33), the vehicle A (the host vehicle) travels on a rural road. In particular, in the period T32, it is assumed that the pedestrian, a bicycle, and the like are not present and that the vehicle A travels on a road in a relatively monotonous shape at a specified speed.

The periods T31, T33 each correspond to a situation where the predictive function must be executed to avoid the parked vehicle, to predict running of the pedestrian into the road, and the like. Accordingly, similar to the case in the above-described period T11, the abnormality determination apparatus determines the driver abnormality by checking the results of the function levels of the driver, which are detected by the involuntary function detection section, the predictive function detection section, and the base function detection section, and the combination thereof with the specified condition or criterion.

Here, the detection of whether the driving function (the high-order and low-order voluntary functions) or the involuntary function is executed in the apparatus of the present invention means detection made for purposes of life saving and ensuring safety by the early determination of the driver abnormality, and includes aspects such as the estimation and the determination in apparatus hardware. In addition, the detection by the apparatus of the present invention is a different concept from a determination that is made by a medical practitioner who sees a human body and determines whether the human body functions normally.

A further specific description will be made on a configuration example and an operation example of the abnormality detection apparatus in the following embodiment.

Embodiment (Vehicle Control System)

Figure 5:
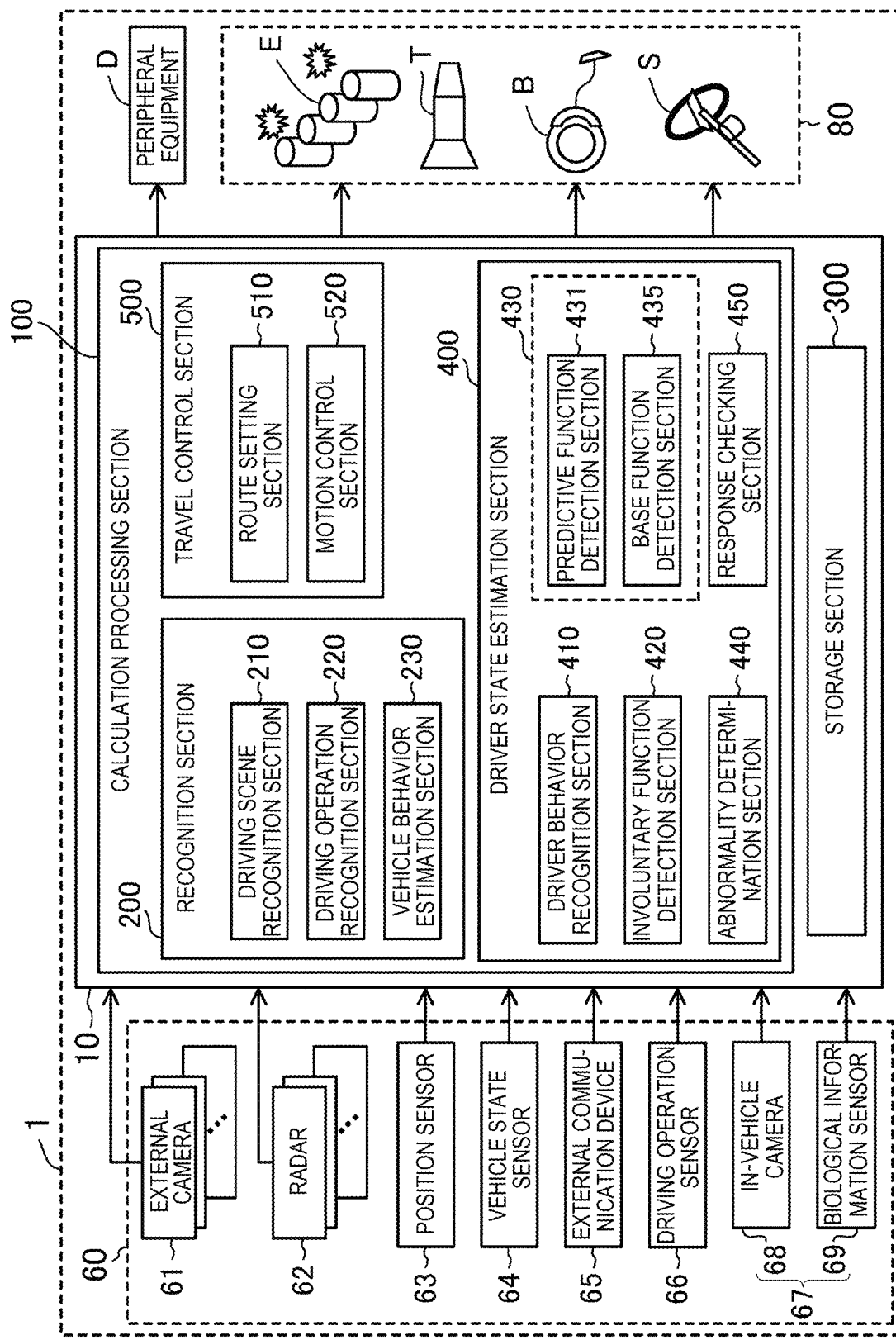
FIG. 5 is a block diagram illustrating a functional configuration of a vehicle arithmetic unit.

FIG. 1 and FIG. 5 exemplify a configuration of a vehicle control system 1 according to the embodiment. The vehicle control system 1 is provided in the vehicle A. The vehicle control system 1 includes a vehicle controller 10, an information acquisition apparatus 60, an actuator 80, and a peripheral equipment D. The vehicle controller 10 can include a calculating processing section 100 and a storage section 300 (discussed in more detail below). The vehicle A can be switched among manual driving, assisted driving, and automated driving. The manual driving is driving in which the vehicle A travels according to an operation by the driver (for example, an operation of an accelerator pedal or the like). The assisted driving is driving in which the vehicle A travels while the operation by the driver is assisted. The automated driving is driving in which the vehicle A travels without the operation by the driver.

[Vehicle Controller]

The vehicle controller 10 controls the vehicle in the assisted driving and the automated driving. More specifically, the vehicle controller 10 controls operation (particularly, the travel) of the vehicle by controlling the actuator 80 that is provided in the vehicle.

[Information Acquisition Apparatus]

The information acquisition apparatus 60 at least acquires information for specifying the driving scene of the vehicle A and information for specifying the driver state. The driving scenes of the vehicle A include the travel scene and the stop scene of the vehicle. The information acquisition apparatus 60 includes plural external cameras 61, plural radars 62, a position sensor 63, a vehicle state sensor 64, an external communication device 65, a driving operation sensor 66, and a driver state sensor 67.

<External Camera>

The plural external cameras 61 are provided to the vehicle A in a manner capable of capturing images of environment around the vehicle A (including an on-road obstacle, hereinafter referred to as external environment), and capture images of the external environment, for example. Imaging data that is acquired by each of the plural external cameras 61 is transmitted to the vehicle controller 10. The external camera 61 is an example of an external environment acquisition device that acquires external environment information of the vehicle A (hereinafter simply referred to as the external environment acquisition device). The imaging data of the external camera 61 is an example of the external environment information for specifying the driving scene of the vehicle A (hereinafter simply referred to as the external environment information). The external camera 61 means a general camera that captures the image of the exterior environment, and includes a camera that is provided in a cabin and captures an image of the outside of the vehicle.

Each of the plural external cameras 61 is a monocular camera having a wide-angle lens. For example, the external camera 61 is configured by using solid-state imaging elements such as a charge-coupled device (CCD) and a complementary metal-oxide-semiconductor (CMOS). Here, the external camera 61 may be a monocular camera having a narrow-angle lens or a stereo camera having a wide-angle lens or a narrow-angle lens. The external cameras 61 may include an image sensor that takes fixed and/or moving images in the visual spectrum and/or non-visual ranges such as infrared and ultraviolet.

<Radar>

The plural radars 62 are attached to a body or the like of the vehicle A in a manner capable of detecting an object (including the on-road obstacle) in the external environment, that is, capable of emitting a radio wave, which is used to detect the object, toward the outside of the vehicle. Image data that is acquired by each of the plural radars 62 is transmitted to the vehicle controller 10.

Although a type of the radar 62 is not particularly limited, examples of the radar 62 are a millimeter-wave radar using a millimeter wave, a lidar (light detection and ranging) using a laser beam, an infrared radar using infrared light, and an ultrasonic radar using an ultrasonic wave. A detection result by the radar 62 is an example of external environment information.

<Position Sensor>

The position sensor 63 detects a position (for example, a latitude and a longitude) of the vehicle. For example, the position sensor 63 receives GPS information from the Global Positioning System and detects the position of the vehicle based on the GPS information. The information (the position of the vehicle) that is acquired by the position sensor 63 is transmitted to the vehicle controller 10. The positional information of the vehicle that is detected by the position sensor 63 can be used to specify the driving scene of the vehicle. That is, the position sensor 63 is an example of an external information acquisition device, and the positional information of the vehicle A, which is detected by the position sensor 63, is an example of the external environment information.

<Vehicle State Sensor>

The vehicle state sensor 64 detects a state (for example, a speed, acceleration, a yaw rate, or the like) of the vehicle. Examples of the vehicle state sensor 64 are a vehicle speed sensor that detects the speed of the vehicle, an acceleration sensor that detects the acceleration of the vehicle, and a yaw rate sensor that detects the yaw rate of the vehicle. Information (the vehicle state) that is acquired by the vehicle state sensor 64 is transmitted to the vehicle controller 10.

<External Communication Device>

The external communication device 65 receives various types of information through an external network (for example, the Internet or the like) that is provided on the outside of the vehicle. For example, the external communication device 65 receives information on another vehicle from the other vehicle positioned around the vehicle, and receives car navigation data, traffic information, high-precision map information, and the like from a navigation system (not illustrated). The information that is acquired by the external communication device 65 is transmitted to the vehicle controller 10. The information such as the traffic information and the high-precision map information that is acquired by the external communication device 65 from the external network includes the information for specifying the driving scene of the vehicle A. That is, the external communication device 65 is an example of the external information acquisition device, and the information received by the external communication device 65 is an example of the external environment information.

<Driving Operation Sensor>

The driving operation sensor 66 detects the driving operation on the vehicle. Examples of the driving operation sensor 66 are an accelerator operation amount sensor, a steering angle sensor, and a brake hydraulic pressure sensor.

The accelerator operation amount sensor detects an operation amount of the accelerator pedal of the vehicle A. The steering angle sensor detects a steering angle of a steering wheel of the vehicle A. The brake hydraulic pressure sensor detects an operation amount of a brake of the vehicle A. The information (the driving operation of the vehicle) that is acquired by the driving operation sensor 66 is transmitted to the vehicle controller 10. The driving operation sensor 66 can detect the driver state from the driving operation. That is, the driving operation sensor 66 can also be used as the driver state sensor. The driving operation sensor 66 is an example of a sensor that constitutes a sensor group.

<Driver State Sensor>

The driver state sensor 67 detects the state of the driver who drives the vehicle (for example, body behavior, biological information, and the like of the driver). More specifically, the driver state sensor 67 detects one or plural states of the head behavior of the driver and motion of the eyeballs and movement of a sightline of the driver, for example. Information (the driver state) that is acquired by the driver state sensor 67 is transmitted to the vehicle controller 10. Examples of the driver state sensor 67 are an in-vehicle camera 68 and a biological information sensor 69. The driver state sensor 67 is an example of the sensor that constitutes the sensor group.

<<In-Vehicle Camera>>

One or a plurality of the in-vehicle cameras 68 is installed in the vehicle A. For example, the in-vehicle camera 68 is installed in front of the driver such that the driver's eyeballs are positioned within an imaging area. In addition, for example, the in-vehicle camera 68 is installed in a manner capable of capturing an image of the head behavior of the driver from a position in front of and above the driver. One or the plurality of the thus-installed in-vehicle cameras 68 acquires image data that includes the driver's head and the driver's eyeballs. Imaging data by the in-vehicle camera 68 is transmitted to the vehicle controller 10. In the vehicle controller 10, information acquired by the in-vehicle camera 68 is used to detect the motion of the eyeballs and/or the movement of the sightline of the driver and to detect the head behavior of the driver, for example. The in-vehicle camera 68 that acquires the image data including the eyeballs may be provided to a google (not illustrated) worn by the driver.

<<Biological Information Sensor>>

The biological information sensor 69 detects the biological information (for example, sweating, heartbeats, a blood flow rate, a skin temperature, and the like) of the driver. Information (the biological information of the driver) that is acquired by the biological information sensor 69 is transmitted to the vehicle controller 10.

Vehicle Controller

The vehicle controller 10 includes a calculation processing section 100 and a storage section 300. The calculation processing section 100 has a driving scene recognition section 210, a driving operation recognition section 220, a vehicle behavior estimation section 230, a travel control section 500, and a driver state estimation section 400.

The vehicle controller 10 includes a processor (corresponding to the calculation processing section 100) and memory (corresponding to the storage section 300), for example. The memory stores a module as software that can be run by the processor. A function of each of the sections in the vehicle controller 10 illustrated in FIG. 5 is executed, for example, when the processor executes respective one of the modules stored in the memory. The memory also stores data on models that are used by the vehicle controller 10. The plural processors and plural pieces of the memory may be provided. In addition, some of the functions of the sections in the calculation processing section 100 illustrated in FIG. 5 may be performed by a hardware circuit. The calculation processing section 100 will be described below. Optionally, the calculation processing section 100 may include a processor 835 and other circuitry in system 800 of FIG. 25, which may be implemented as a single processor-based system, or a distributed processor-based system, including remote processing, such as cloud-based processing.

<Recognition Section>

A recognition section 200 includes the driving scene recognition section 210, the driving operation recognition section 220, and the vehicle behavior estimation section 230.

<Driving Scene Recognition Section>

The driving scene recognition section 210 recognizes the driving scene of the vehicle based on the external environment information that is acquired by the external information acquisition device. More specifically, the driving scene recognition section 210 recognizes the driving scene of the vehicle by using the external environment information that is acquired by one or plural external cameras 61, the radars 62, the position sensor 63, the external communication device 65, and the vehicle behavior estimation section 230.

For example, the driving scene recognition section 210 provides a learning model, which is generated by deep learning, with the external environment information as input, to generate driving scene information on the driving scene of the vehicle. In the deep learning, a deep neural network is used. An example of the deep neural network is a convolutional neural network (CNN).

For example, the driving scene recognition section 210 performs image processing on the image that is captured by the external camera 61, to generate two-dimensional map data on an area where the vehicle A can move. In addition, the driving scene recognition section 210 acquires object information that is information on an object existing around the vehicle based on the detection results by the radars 62. Based on the object information, the driving scene recognition section 210 recognizes the on-road obstacle among the objects existing around the vehicle. The on-road obstacle can be an obstacle in a process of traveling and stopping of the vehicle, e.g., on a collision course with the vehicle. Examples of the object are a movable object that is displaced over time and a stationary object that is not displaced over time. Examples of the movable object are a four-wheeled motor vehicle, a two-wheeled motor vehicle, the bicycle, and the pedestrian. Examples of the stationary object are a traffic sign, a roadside tree, a median strip, a center pole, and a building. The object information includes positional coordinates of the object, a speed of the object, and the like. Here, the driving scene recognition section 210 may acquire the object information based on the images acquired by the external cameras 61 in addition to or instead of the detection results by the radars 62. Then, the driving scene recognition section 210 integrates the two-dimensional map data and the object information to generate integrated map data (three-dimensional map data) on the external environment, and updates the map data at specified time intervals to recognize the driving scene of the vehicle.

<Driving Operation Recognition Section>

The driving operation recognition section 220 recognizes the driving operation on the vehicle by the driver based on output of the driving operation sensor 66. More specifically, for example, the driving operation recognition section 220 detects operations of the accelerator pedal, the brake pedal, the steering wheel, a shift lever, a direction indicator, and a switch of an electrical component by the driver, for example. A driving motion sensor herein includes the driving operation sensor 66 and the driver state sensor 67. That is, the driving operation recognition section 220 detects the driving function of the driver based on a situation of the driving operation by the driver, which is detected by the driving operation sensor 66, and the driver state, which is detected by the driver state sensor 67 (for example, the in-vehicle camera 68 and the like). As described above, the detection data by the driving motion sensor is partially or entirely transmitted to a driver behavior recognition section 410, which in turn recognizes the driver state. Accordingly, the driving operation recognition section 220 may use a recognition result by the driver behavior recognition section 410 (for example, a head behavior detection section 411 and/or a sightline behavior detection section 412). The driving operation recognition section 220 may improve recognition accuracy of the driving operation by referring to the driving scene information acquired by the driving scene recognition section 210 in addition to the input of the driving operation sensor 66.

<Vehicle Behavior Estimation Section>

The vehicle behavior estimation section 230 estimates behavior (for example, the speed, the acceleration, the yaw rate, and the like) of the vehicle based on the output of the vehicle state sensor 64. For example, the vehicle behavior estimation section 230 generates vehicle behavior data on the behavior of the vehicle based on the output of the vehicle state sensor 64 by using the learning model that is generated by the deep learning.

For example, the learning model that is used by the vehicle behavior estimation section 230 is a vehicle six-axis model. In the vehicle six-axis model, the acceleration in three axial directions of "front/rear", "right/left", and "up/down" and angular velocities in three axial directions of "pitch", "roll", and "yaw" of the traveling vehicle are modeled. That is, the vehicle six-axis model is a numerical model that replicates the behavior of the vehicle by using a total of six axes including pitching (a Y-axis) and rolling (an X-axis) motion and movement in a Z-axis (vertical motion of a vehicle body) of the vehicle body placed on four wheels via suspensions instead of capturing motion of the vehicle only on a traditional vehicle dynamics plane (only front/rear and right/left (X-Y movement) and yaw motion (the Z-axis) of the vehicle).

<Travel Control Section>

The travel control section 500 includes a route setting section 510 and a motion control section 520.

<<Route Setting Section>>

The route setting section 510 generates one or plural candidate routes, on each of which the vehicle travels to a target position as a travel target of the vehicle, based on the driving scene recognized by the driving scene recognition section 210. For example, of the plural candidate routes, the route setting section 510 selects the route that the driver feels the most comfortable, and outputs such a route as a travel target route of the vehicle A to the motion control section 520. In addition, for example, in case of such emergency that the driver state estimation section 400, which will be described below, detects the driver abnormality, the route setting section 510 searches for a stop position at which the vehicle stops emergently, sets the stop position as the target position, and generates an evacuation route to the stop position. Then, the route setting section 510 outputs the evacuation route as the travel target route to the motion control section 520.

<<Motion Control Section>>

The motion control section 520 determines target motion as motion of the vehicle that is required for travel on the travel target route set by the route setting section 510, and controls the actuator 80 based on the determined target motion. For example, the motion control section 520 derives target drive power, a target braking force, and a target steering amount that are required to produce the target motion. Then, the motion control section 520 transmits a drive command value indicative of the target drive power, a brake command value indicative of the target braking force, and a steering command value indicative of the target steering amount to the actuator for a drive system, the actuator for a brake system, and the actuator for a steering system, respectively. Examples of the actuator for the drive system are an engine E, a transmission T, and a motor. An example of the actuator for the brake system is a brake B. An example of the actuator for the steering system is a steering wheel S. In the present disclosure, the term actuator 80 is used as a collective term of the actuator for the drive system, the actuator for the brake system, and the actuator for the steering system. In addition, equipment other than the actuators 80 that is mounted to the vehicle A will collectively be referred to as the peripheral equipment D. Examples of the peripheral equipment D are an information display D1 such as a monitor in a car navigation system, a speaker D2 for playing voices and the like, various switches D3 including an engine start switch and driver response switch, a microphone D4 for inputting the driver's voice, and lighting devices such as a headlamp and the direction indicator (not illustrated).

<Driver State Estimation Section>

The driver state estimation section 400 includes the driver behavior recognition section 410, an involuntary function detection section 420, a driving function detection section 430, a response checking section 450, and an abnormality determination section 440. The driver state estimation section 400 has a function of detecting an abnormal physical condition of the driver.

<<Driver Behavior Recognition Section>>

The driver behavior recognition section 410 recognizes the behavior (including behavior of the head and behavior of the sightline) of the driver based on the output of a driver state sensor. The driver state sensor herein includes the driving operation sensor 66 in addition to the driver state sensor 67. That is, there is a case where the driver state can be detected by using the driving operation sensor 66. In such a case, the driving operation sensor 66 is included in the driver state sensor in the technique of the present disclosure. The same applies to the other components of the information acquisition apparatus 60. For example, the driver behavior recognition section 410 includes: a head behavior detection section 411 (see FIG. 7) that detects the behavior of the driver's head based on the imaging data by the in-vehicle camera 68; and a sightline behavior detection section 412 (see FIG. 11) that detects behavior of the driver's sightline on the basis of the imaging data by the in-vehicle camera 68. The head behavior detection section 411 and the sightline behavior detection section 412 will be described below.

<<Involuntary Function Detection Section>>

The involuntary function detection section 420 detects the driver abnormality that is based on the involuntary function based on the detection data by the driver state sensor 67 that detects the driver state. More specifically, as described above, the detection data by the driver state sensor 67 is transmitted to the driver behavior recognition section 410. Accordingly, the involuntary function detection section 420 detects the driver abnormality that is based on the involuntary function based on the output of the driver behavior recognition section 410. For example, the involuntary function detection section 420 calculates the involuntary function level of such a degree that the involuntary function of the driver is executed normally. The involuntary function detection section 420 may have the function of the driver behavior recognition section 410, and the detection data by the driver state sensor 67 may directly be input to the involuntary function detection section 420 for processing.

For example, as the involuntary function levels regarding the driving operation by the driver, the involuntary function detection section 420 (1) can detect a motor function level of the right foot on the basis of detection data by the accelerator operation amount sensor, (2) can detect a motor function level of the left foot on the basis of detection data by the brake hydraulic pressure sensor, and (3) can detect a motor function level of the right hand and/or the left hand on the basis of detection data by the steering angle sensor (see a lower portion of FIG. 6A). Here, the motor function level is an index indicative of such a degree that the motor function is executed normally. FIG. 6A and FIG. 6B are tables, each of which illustrates relationships between detection target items and the function levels that can be measured for the items. For example, the storage section 300 stores the tables in FIG. 6A and FIG. 6B and a determination condition for determining the driver abnormality, which will be described below, in a corresponding manner.

For example, as the involuntary function levels regarding the behavior of the driver's sightline, based on the behavior of the driver's sightline recognized by the sightline behavior detection section 412, the involuntary function detection section 420 (1) can detect a motor function level of a pupillary reflex by calculating microsaccades, (2) can detect the motor function level of the pupillary reflex by calculating an amount of nystagmus, and (3) can detect an autonomic function level of a sympathetic nerve/a parasympathetic nerve of the driver by calculating cycloduction. In addition, the involuntary function detection section 420 can detect a vestibular function level of a vestibular reflex by calculating temporal changes in pupil diameters of the driver based on the imaging data on the sightline by the in-vehicle camera 68 (see a lower portion in FIG. 6B). Here, the vestibular function level is an index indicative of such a degree that the vestibular function is executed normally. Here, the autonomic function level is an index indicative of such a degree that the autonomic function is executed normally.

For example, as the involuntary function levels regarding the behavior of the driver's head, the involuntary function detection section 420 (1) can detect the autonomic function level of the sympathetic nerve/the parasympathetic nerve of the driver by calculating autocorrelation of the head behavior on the basis of the head behavior of the driver, (2) can detect the vestibular function level of a vestibulo-ocular reflex of the driver by calculating cross-correlation between the head and the sightline on the basis of the behavior of the driver's head and the behavior of the driver's sightline, and (3) can detect the autonomic function level of the sympathetic nerve/the parasympathetic nerve of the driver by calculating cross-correlation between the head behavior and an external force on the basis of the behavior of the driver's head and an estimation result of the external force applied to the driver by the vehicle state sensor 64 (see the lower portion in FIG. 6B).

<<Driving Function Detection Section>>

The driving function detection section 430 detects a driving function level of such a degree that the driving function of the driver is executed normally based on detection data by the driving motion sensor that detects the operation by the driver during driving (hereinafter referred to as a driving operation). The driving motion sensor includes the driving operation sensor 66 and the driver state sensor 67.

The driving function detection section 430 includes: a predictive function detection section 431 that detects the above-described predictive function level; and a base function detection section 435 that detects the above-described base function level.

<<Predictive Function Detection Section>>

The predictive function detection section 431 detects the predictive function level based on the driving operation by the driver, the behavior of the driver's sightline, and/or the behavior of the driver's head, for example.

For example, the predictive function level that is based on the driving operation by the driver can be detected by a calculation using the driving scene, which is recognized by the driving scene recognition section 210, and a steer model (hereinafter also referred to as a steer model calculation). More specifically, for example, a spatial attention function level can be detected per driving scene based on a feedback (FB) gain of the steering wheel and/or an estimation error between a model operation of the steering wheel and information on an actual operation of the steering wheel, which is recognized by the driving operation recognition section 220, per driving scene (see an upper portion in FIG. 6A). Here, in the steer model, the steering wheel and a support structure of the steering wheel are modeled, for example. When steering force data that is associated with a steering operation by the driver is input, data on a transition force in a lateral direction of the vehicle is output based on this steering force data.

In addition, for example, the predictive function level that is based on the driving operation by the driver can be detected by a calculation using the driving scene, which is recognized by the driving scene recognition section 210, and a risk prediction model (hereinafter also referred to as a risk model calculation). More specifically, for example, per driving scene, the predictive function detection section 431 (1) can detect a risk predictive function level with respect to the potential risk and attention function levels associated with concentration and allocation on the basis of a magnitude of the potential risk calculated by the risk model calculation, (2) can detect the risk predictive function level with respect to the visible risk, the attention function level associated with the concentration and the allocation, and the spatial attention function level on the basis of a magnitude of the visible risk calculated by the risk model calculation, and (3) the risk predictive function levels with respect to the potential risk, the visible risk, and the road shape, the attention function levels associated with the concentration and the allocation, and the spatial attention function level on the basis of deviation from a low-risk state calculated by the risk model calculation (see the upper portion in FIG. 6A). Here, a type and a content of the risk prediction model are not particularly limited. For example, in the risk prediction model, a risk potential of the host vehicle and a risk potential of the preceding vehicle are set based on a relative speed and a relative distance between the host vehicle and the preceding vehicle, and a risk that can be predicted from these risk potentials is modeled. Here, the risk predictive function level is an index indicative of such a degree that the risk predictive function is executed normally. In addition, the attention function level is an index indicative of such a degree that the attention function is executed normally. The "attention function level associated with the concentration and the allocation" can be calculated based on a detection result by the sightline behavior detection section 412, for example.

Furthermore, for example, the predictive function level that is based on the driving operation by the driver can be detected by a calculation using the driving scene, which is recognized by the driving scene recognition section 210, and a road shape prediction model (hereinafter also referred to as a road model calculation). More specifically, for example, per driving scene, the predictive function detection section 431 (1) can detect the risk predictive function level with respect to the road shape, the attention function levels associated with the concentration and the allocation, and the spatial attention function level on the basis of prediction control in the lateral direction that is calculated by the road model calculation, and (2) can detect the risk predictive function levels with respect to the potential risk and the visible risk and the attention function levels associated with the concentration and the allocation on the basis of prediction control in a vertical direction that is calculated by the road model calculation (see the upper portion in FIG. 6A). Here, the road shape prediction model is a model in which a future road shape is predicted, may be stored in the storage section 300 in advance, or may be generated by the calculation processing section 100 based on the imaging data (target data) by the external cameras 61 and the radars 62 and the positional information detected by the position sensor 63.

For example, the predictive function level that is based on the behavior of the driver's sightline can be detected by a calculation using the driving scene, which is recognized by the driving scene recognition section 210, and the behavior of the driver's sightline, which is recognized by the sightline behavior detection section 412. More specifically, for example, the predictive function detection section 431 (1) can detect the attention function level related to the attention allocation during driving by calculating a matching degree between a point to be looked at and the driver's sightline per driving scene, (2) can detect the risk predictive function levels with respect to the potential risk and the visible risk and the attention function level related to the attention allocation during driving by calculating, as a saliency index value per the driving scene, an area under the curve (AUC) value, (3) can detect the risk predictive function level with respect to the visible risk by calculating an amplitude of a saccade per driving scene, and (4) can detect the risk predictive function level with respect to the potential risk and the attention function level related to the attention allocation during driving by calculating a frequency of the saccade per driving scene (see the upper portion in FIG. 6B).

For example, the predictive function level that is based on the behavior of the driver's head can be detected by a calculation using the driving scene, which is recognized by the driving scene recognition section 210, and the behavior of the driver's head, which is recognized by the head behavior detection section 411. More specifically, for example, the predictive function detection section 431 (1) can detect the attention function level related to the attention allocation during driving by calculating the cross-correlation between the head behavior and the external force on the basis of the behavior of the driver's head and the estimation result of the external force applied to the driver by the vehicle state sensor 64 per driving scene, and (2) can detect the attention function level related to the attention allocation during driving by calculating eccentricity of a head position per driving scene (see the upper portion in FIG. 6B).

<<Base Function Detection Section>>

The base function detection section 435 detects the base function level based on the driving operation by the driver, the behavior of the driver's sightline, and/or the behavior of the driver's head, for example.

For example, the base function level that is based on the driving operation by the driver can be detected by a calculation using the driving scene, which is recognized by the driving scene recognition section 210, and a pedal model (hereinafter also referred to as a pedal model calculation). More specifically, for example, a perceptual function level in the vertical direction and/or the motor function level of the foot can be detected per driving scene based on a feedback (FB) gain of the pedal, a delay in a pedal operation, performance of pedal control, and/or an estimation error between a model operation and an actual operation of the pedal (see a middle portion in FIG. 6A). Here, for example, in the pedal model, the accelerator pedal/the brake pedal and pedal support structures thereof are modeled. When data on a depression force that is associated with the accelerator operation/the brake operation by the driver is input, thrust force data of an operation rod is output based on this depression force data.

In addition, for example, as the base function level that is based on the driving operation by the driver, the perceptual function level in the lateral direction and/or the motor function level of the hand can be detected per driving scene based on the feedback (FB) gain of the steering, a travel position, and/or the estimation error between the model operation and the actual operation of the steering wheel (see the middle portion in FIG. 6A). Here, the perceptual function level is an index indicative of such a degree that the perceptual function is executed normally.

For example, the base function level that is based on the behavior of the driver's sightline can be detected by a calculation using the driving scene, which is recognized by the driving scene recognition section 210, and the behavior of the driver's sightline, which is recognized by the sightline behavior detection section 412. More specifically, for example, the perceptual function level regarding a range of vision can be calculated per driving scene by calculating one or plural of (1) a bilateral difference between the saccades of the left eye and the right eye, (2) sightline distribution, and (3) the amount of nystagmus. In addition, the motor function level related to motion of the eyeballs can be detected per driving scene by calculating a speed of the saccade (see the middle portion in FIG. 6B).

For example, the base function level that is based on the behavior of the driver's head can be detected by a calculation using the driving scene, which is recognized by the driving scene recognition section 210, the behavior of the driver's head, which is recognized by the head behavior detection section 411, the behavior of the driver's sightline, which is recognized by the sightline behavior detection section 412, and the recognition result by the driving operation recognition section 220. More specifically, for example, the base function detection section 435 (1) can detect the perceptual function levels related to the range of vision and a cognitive response time during driving as well as the motor function level related to the motion of the eyeballs by calculating the cross-correlation between the head behavior and the sightline behavior of the driver per driving scene, and (2) can detect the motor function levels of the hand and the foot by calculating cross-correlation between the head behavior and hand/foot functions of the driver per driving scene (see the middle portion in FIG. 6B).

<<Abnormality Determination Section>>

The abnormality determination section 440 refers to a sensor table (see FIG. 14), which will be described below, and determines the driver abnormality based on output of an abnormality determination sensor that corresponds to the driving scene of the vehicle, which is recognized by the driving scene recognition section 210. As described above, the abnormality determination sensor includes one or plural of the driving operation sensor 66 and the driver state sensor 67.

As an example of a specific processing procedure, the output of the driving operation sensor 66 and/or the driver state sensor 67 is transmitted to the driving operation recognition section 220 and is recognized as the driving operation by the driver by the driving operation recognition section 220. The output of the driving operation sensor 66 and/or the driver state sensor 67 is also transmitted to the driver behavior recognition section 410 and is recognized as the behavior (including the head behavior and the sightline behavior) of the driver by the driver behavior recognition section 410. Then, the involuntary function detection section 420 calculates the involuntary function level based on the recognition result by the driver behavior recognition section 410. In addition, the driving function detection section 430 detects the predictive function level and the base function level based on the recognition result by the driver behavior recognition section 410. The abnormality determination section 440 receives the involuntary function level, which is calculated by the involuntary function detection section 420, as well as the predictive function level and the base function level, which are calculated by the driving function detection section 430, and comprehensively determines these to determine the driver abnormality.

For example, according to the driving scene recognized by the driving scene recognition section 210, the abnormality determination section 440 selects one or plural of the involuntary function level, the predictive function level, and the base function level for use in the abnormality determination. In the case where the selected function level(s) including a combination thereof matches a specified condition, the abnormality determination section 440 determines that the driver is abnormal. For convenience of description, the function level that is selected according to the driving scene will be referred to as a target function level. For example, in the example illustrated in FIG. 4, the target function levels in the periods T11, T13, T21, T25, T31, T33 are the involuntary function level, the predictive function level, and the base function level. The target function levels in the periods T22, T24, T32 are the involuntary function level and the base function level. The target function level in the periods T12, T23 is the involuntary function level.

A type of the specified condition for the determination of the driver abnormality is not particularly limited. For example, a specified threshold may be provided for the calculated function level, and the driver abnormality may be determined based on a comparison between the function level and the threshold. Alternatively, for example, an index that serves as a criterion, a reference model, or the like may be prepared, and the driver abnormality may be determined based on a matching degree with or divergence from such a criterion or a reference model. A specific example thereof will be described below.

The specified condition may be stored in the storage section 300 in advance or may be able to be set from the outside of the vehicle A. Alternatively, the specified condition may be set for each of the one or plural function levels constituting the target function level. Furthermore, a level value of each of the function levels may be scored or added, or a weighted average of such values may be calculated to set the specified condition or criterion with respect to a total score of the target function levels.

The abnormality determination section 440 may determine that the sign of the driver abnormality is recognized in the case where the target function level matches the specified condition. Then, after the response checking section 450 checks the driver's response, the abnormality determination section 440 may finally determine the driver abnormality. That is, when determining the driver abnormality, the abnormality determination section 440 may make the determination in a stepwise manner including an inquiry to the driver.

<<Response Checking Section>>

The response checking section 450 has a function of checking the driver's response in the case where the abnormality determination section 440 determines that the sign of the driver abnormality is recognized. The response checking section 450 includes an inquiry section 451 and a response detection section 452.

The inquiry section 451 makes an inquiry to the driver when receiving an inquiry request for the driver from the abnormality determination section 440. This inquiry is made to check the driver's intention on whether the driver accepts emergency evacuation of the vehicle by the automated driving. For example, the inquiry is made by the voice via the speaker D2 or is displayed via the information display D1 such as the monitor.

The response detection section 452 detects the driver's response to the inquiry by the inquiry section 451. For example, the driver's response is made by operating the switch D3 or a speech using the microphone D4. When the driver's intention on the emergency stop can be checked, or when the driver's response is not made, the abnormality determination section 440 instructs the travel control section 500 to make the vehicle automatically evacuate to a road shoulder for a stop.

Storage Section

The storage section 300 stores the sensor table that illustrates relationships between the driving scenes of the vehicle, which are recognized by the driving scene recognition section 210, and the abnormality determination sensors adopted for the driver abnormality determination. FIG. 14 illustrates an example of the sensor table stored in the storage section 300.

In FIG. 14, the driving scenes of the vehicle, which are recognized by the driving scene recognition section 210, are described in a left column, and the abnormality determination sensors that can be used in each of the driving scenes are presented in center columns. Here, the driving operation sensor 66 and the in-vehicle camera 68 are exemplified as the abnormality determination sensors. On a right column, specific determination items are exemplified. In FIG. 14, indices of "DRIVING OPERATION SENSOR", "HEAD BEHAVIOR", and "SIGHTLINE BEHAVIOR" respectively correspond to the items "OPERATION", "HEAD", and "SIGHTLINE" in FIGS. 6A, 6B. In addition, in FIG. 14, a "circle" indicates the item that can be used for the abnormality determination, and a symbol "–" indicates the item, use of which for the abnormality determination is difficult. Furthermore, C in FIG. 14 is added with a reference numeral according to a reason for the difficulty. C1 indicates that action corresponding to the determination target is not performed. C2 indicates that a difference in action between an abnormal time and a normal time hardly occurs at a stage of the sign. C3 indicates that disturbance is significant.

As illustrated in FIG. 14, a single type of the sensor (for example, the in-vehicle camera 68) may be used to measure the plural items (for example, the head behavior and the sightline behavior). Alternatively, a sensor other than the driving operation sensor 66 and the in-vehicle camera 68 may be used as the abnormality determination sensor. That is, the sensor group may include the abnormality determination sensor other than the driving operation sensor 66 and the in-vehicle camera 68. Furthermore, the sensor group may include a sensor other than the abnormality determination sensors.

As described above, the storage section 300 also stores the modules as the software that can be run by the vehicle controller 10. The storage section 300 further stores data on the models used by the vehicle controller 10 (for example, a driving operation learning model 415 and a driving operation estimation model 416, which are described below).

Examples of Function Level Detection Processing and Abnormality Determination Processing in Each Stratum A description will hereinafter be made on detection operation of the function level and abnormality determination operation thereafter in each of the strata (action) including the involuntary action, the base action, and the predictive action by using a specific example. The following description will be made on an example of the detection operation of the function level in each of the strata to facilitate understanding of the invention and has no intention to limit the invention to the content of the following description. That is, a detection method other than that in the following description may be used to detect the function level in each of the strata.

<Detection Processing of Involuntary Function Level>

A description will herein be made on a detection operation example of the involuntary function levels related to the head behavior and the sightline behavior among the detection items of the involuntary function level related to the involuntary action illustrated in the lower portion in FIG. 6A and the lower portion in FIG. 6B with reference to the drawings.

<<Head Behavior>>

Figure 7:
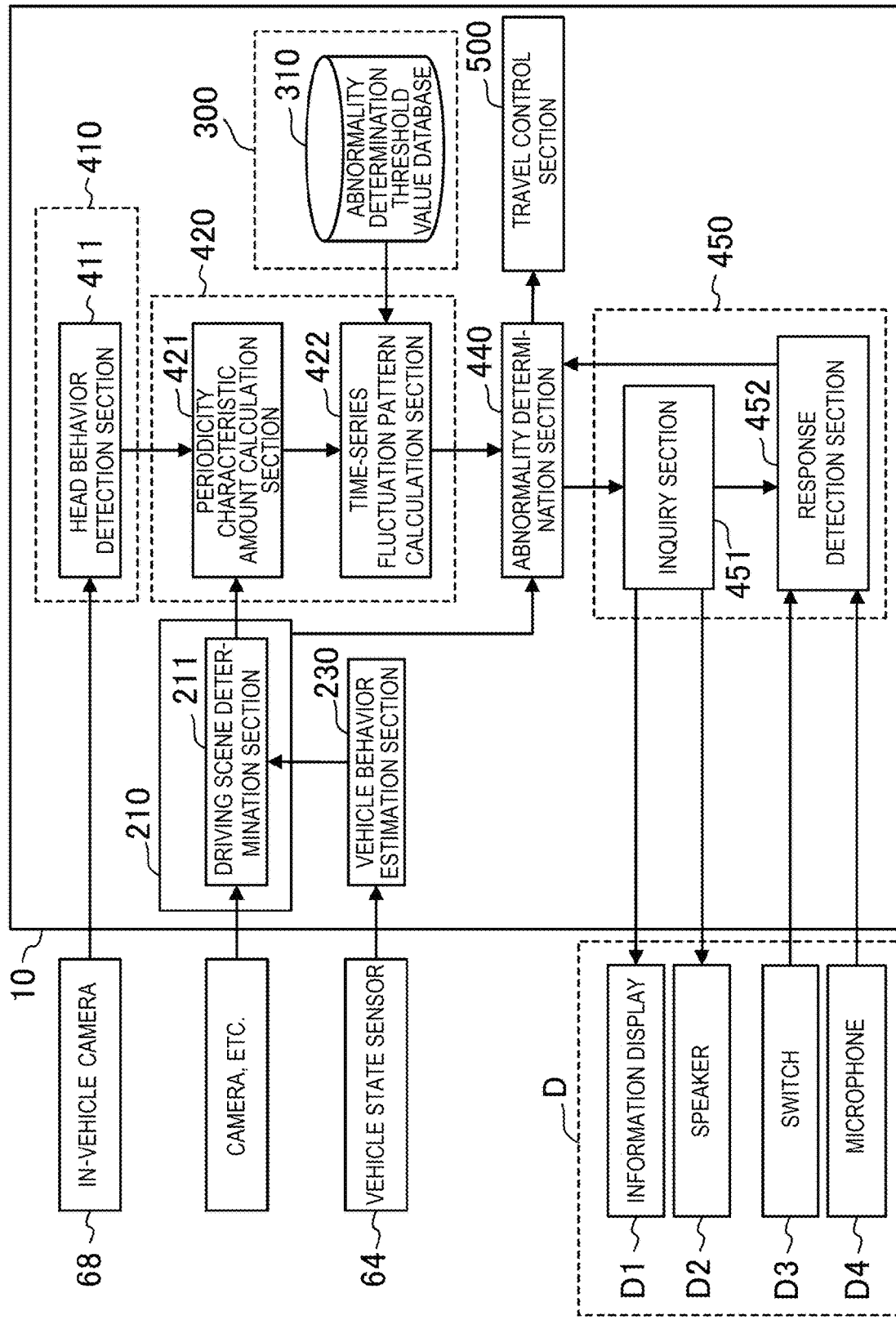
FIG. 7 is a block diagram for illustrating detecting operation in an involuntary function level.

A description will be made on the detection operation example of the involuntary function level related to the head behavior with reference to FIG. 7 to FIG. 9. FIG. 7 is a block diagram for illustrating the detection operation of the involuntary function level. The blocks used for the description are extracted from the configuration illustrated in FIG. 5, and internal blocks are added when necessary.

More specifically, in the example of FIG. 7, the driving scene recognition section 210 includes a driving scene determination section 211. The involuntary function detection section 420 includes a periodicity characteristic amount calculation section 421 and a time-series fluctuation pattern calculation section 422. The response checking section 450 includes an inquiry section 451 and a response detection section 452. In addition, as described above, the driver behavior recognition section 410 includes the head behavior detection section 411.

In FIG. 7, the head behavior detection section 411 detects the behavior of the driver's head from the image captured by the in-vehicle camera 68. For example, the head behavior detection section 411 recognizes the driver's head from the image and calculates an inclination angle of the head, for example, a pitch angle and a roll angle thereof. The processing in the head behavior detection section 411 can be executed by the existing image processing technique.

Figure 9:
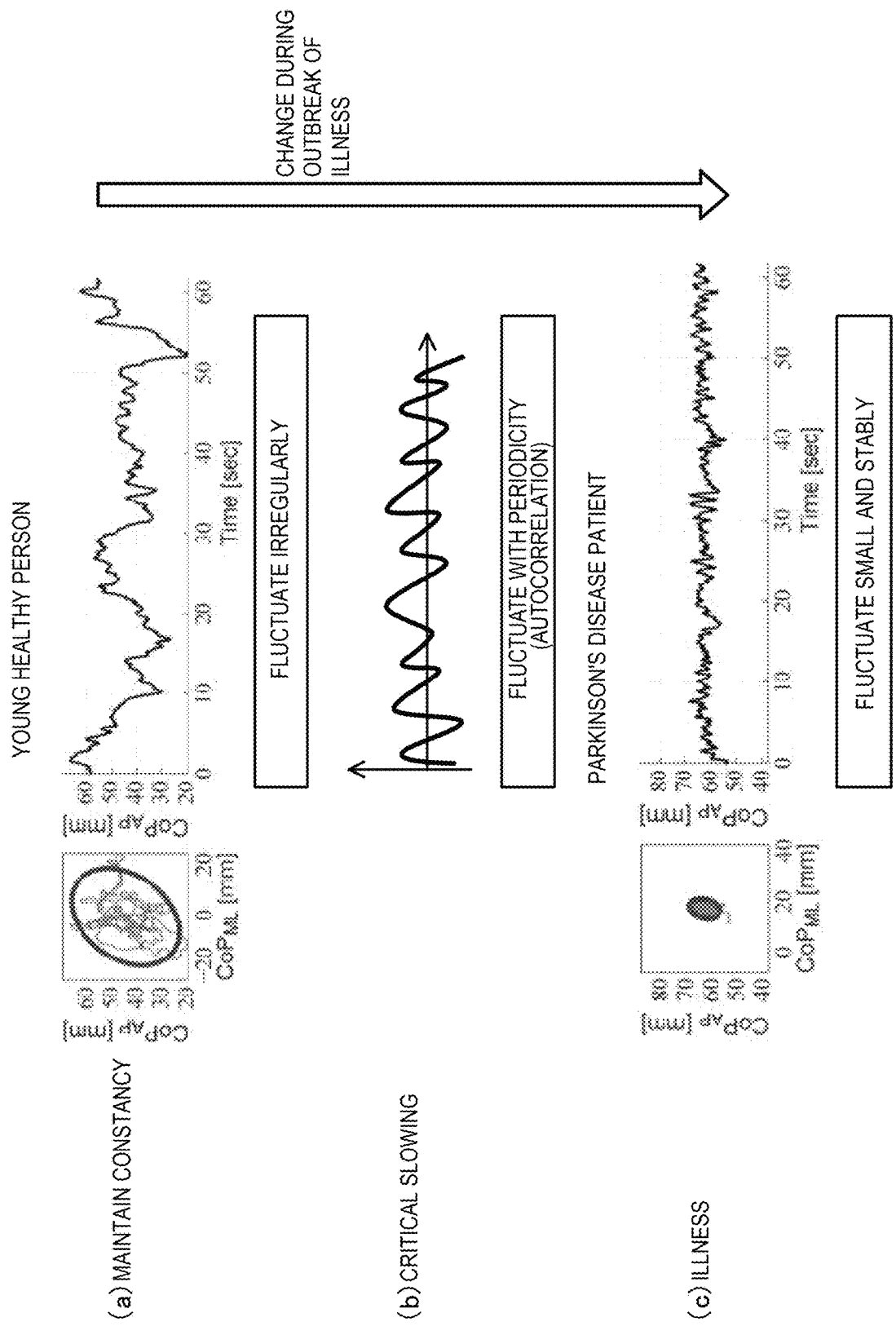
FIG. 9 is a view illustrating relationships between constancy of head behavior and an illness, in which (a) illustrates a normal state, (b) illustrates a critical slowing state, and (c) illustrates a sick state.

FIG. 9 includes graphs, each of which illustrates a relationship between constancy of the head behavior and the illness (see Non-Patent documents 2, 3). Each of the graphs in FIG. 9 represents the motion of the head that is seen from above, in which (a) represents the normal state where the constancy is maintained, (b) represents a state called critical slowing between the normal state and a sick state, and (c) represents the sick state. The graphs in FIGS. 9(a), (c) are cited from Non-Patent document 2.

The human has a function called consistency to keep a state being constant with respect to the disturbance. The consistency of the head behavior means a property that the driver tries to keep a head posture while driving. As illustrated in FIG. 9(a), in the normal state, the head fluctuates irregularly to keep the constancy. On the other hand, as illustrated in FIG. 9(c), in the sick state, the fluctuation of the head is reduced, and the behavior thereof becomes stable. Then, as illustrated in FIG. 9(b), it is considered that, in the critical slowing state in transition from the normal state to the sick state, the head fluctuates with periodicity (autocorrelation) (see Non-Patent document 3).

Figure 8:
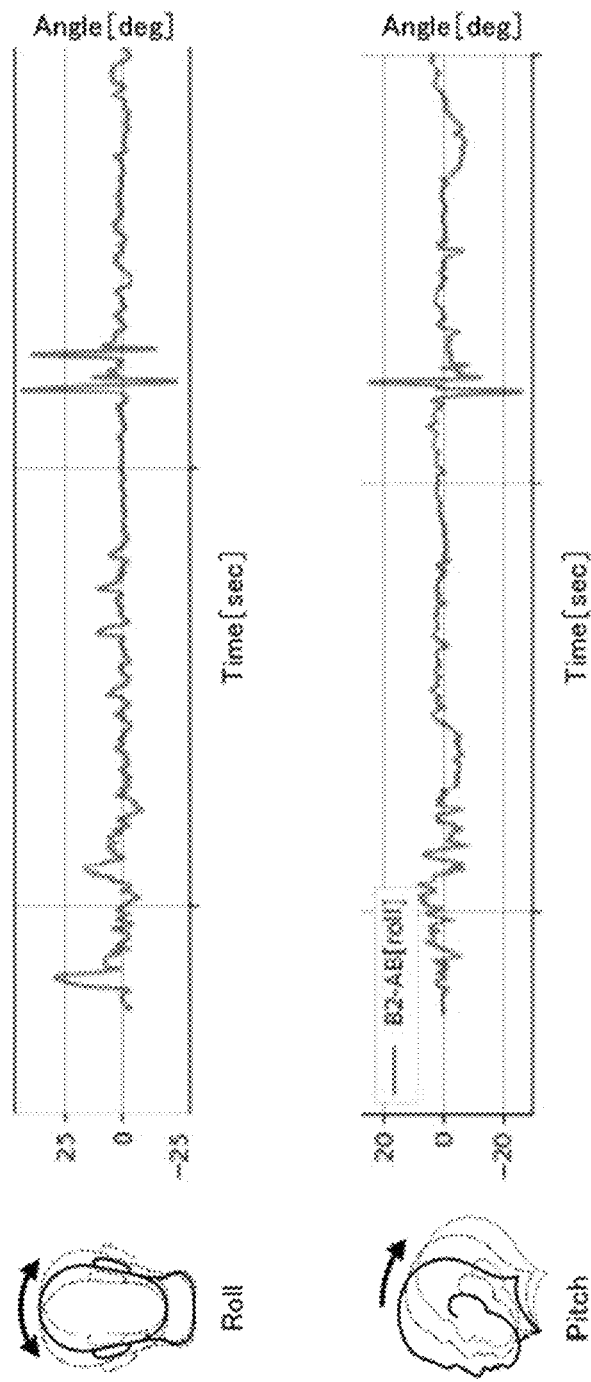
FIG. 8 includes examples of time-series data of a roll angle and a pitch angle of a head.

Thus, in this embodiment, time-series data on the head behavior as illustrated in FIG. 8 is acquired by the processing executed by the head behavior detection section 411. The time-series data on the head behavior is transmitted to the involuntary function detection section 420.

The driving scene determination section 211 determines whether the vehicle travel state corresponds to a travel state as illustrated in C3 in FIG. 14 (the state where the disturbance with respect to the head behavior is significant) based on the driving scene, which is recognized by the driving scene recognition section 210, and the vehicle behavior data, which is received from the vehicle behavior estimation section 230. For example, during the travel at a corner, the detection of the sign of the driver abnormality tends to be difficult, and the driving scene determination section 211 determines whether the current driving scene corresponds to such a scene. For example, the driving scene determination section 211 regards the acceleration in a right-left direction of the vehicle, which is indicated by the vehicle behavior data, as lateral acceleration applied to the driver's head, and determines whether such acceleration exceeds a specified value.

In the case where the acceleration exceeds the specified value, the driving scene determination section 211 determines that the current driving scene is the scene where the detection of the sign of the driver abnormality is difficult. The determination result by the driving scene determination section 211 is transmitted to the involuntary function detection section 420.

The periodicity characteristic amount calculation section 421 calculates a periodicity characteristic amount from the time-series data on the head behavior, which is acquired by the head behavior detection section 411. More specifically, for example, the periodicity characteristic amount calculation section 421 calculates, as the periodicity characteristic amount, an autocorrelation index (a scaling index a) by a detrended fluctuation analysis (DFA). In addition, when the driving scene determination section 211 determines that the current driving scene is the scene where the detection of the sign of the driver abnormality is difficult, the periodicity characteristic amount calculation section 421 does not calculate the periodicity characteristic amount.

Figure 10:
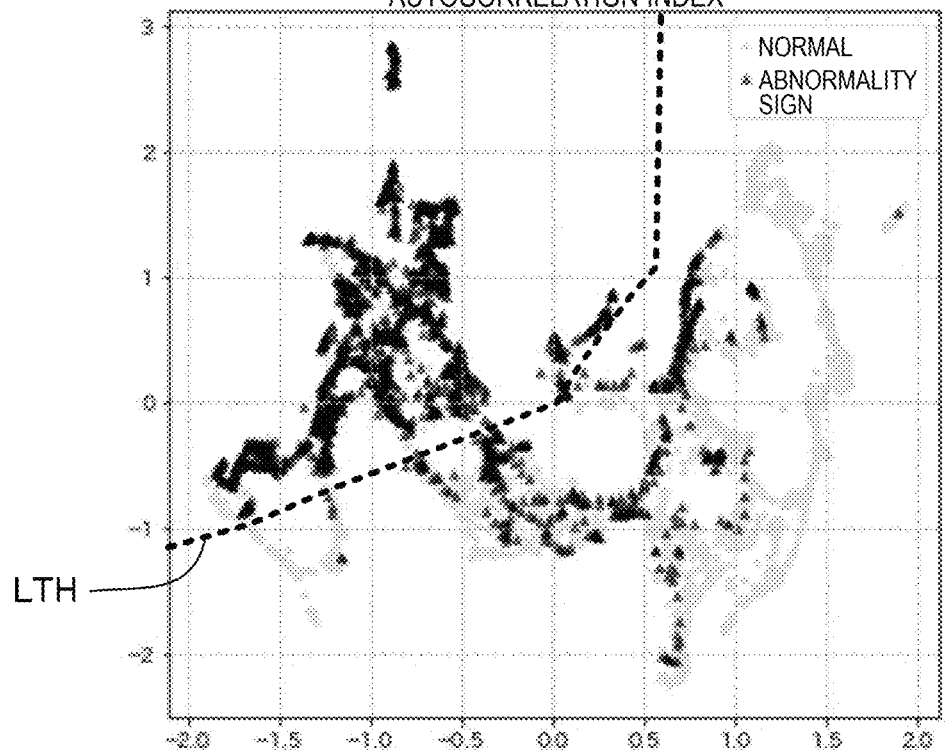
FIG. 10 is a graph illustrating a classification result of time-series fluctuation patterns of an autocorrelation index.

The time-series fluctuation pattern calculation section 422 divides time-series data on the periodicity characteristic amount, which is acquired by the periodicity characteristic amount calculation section 421, in a time order, calculates time-series fluctuation patterns from the divided time-series data, and categorizes the patterns. More specifically, for example, the time-series fluctuation pattern calculation section 422 reduces a dimension of the time-series data on the periodicity characteristic amount by using UMAP as a non-linear dimension compression method, and converts the time-series data into two-dimensional data. Then, the time-series fluctuation pattern calculation section 422 compares the data acquired by this two-dimensional data conversion with the threshold in an abnormality determination threshold database 310 stored in the storage section 300, calculates the involuntary function level based on the comparison result, and outputs the involuntary function level to the abnormality determination section 440. For example, a determination line LTH in a two-dimensional map illustrated in FIG. 10 corresponds to the threshold stored in the abnormality determination threshold database 310. The time-series fluctuation pattern calculation section 422 calculates the involuntary function level based on which side of the determination line LTH the data acquired by the two-dimensional data conversion is located and how far such data is separated from the determination line LTH on the two-dimensional map.

<<Sightline Behavior>>

Figure 11:
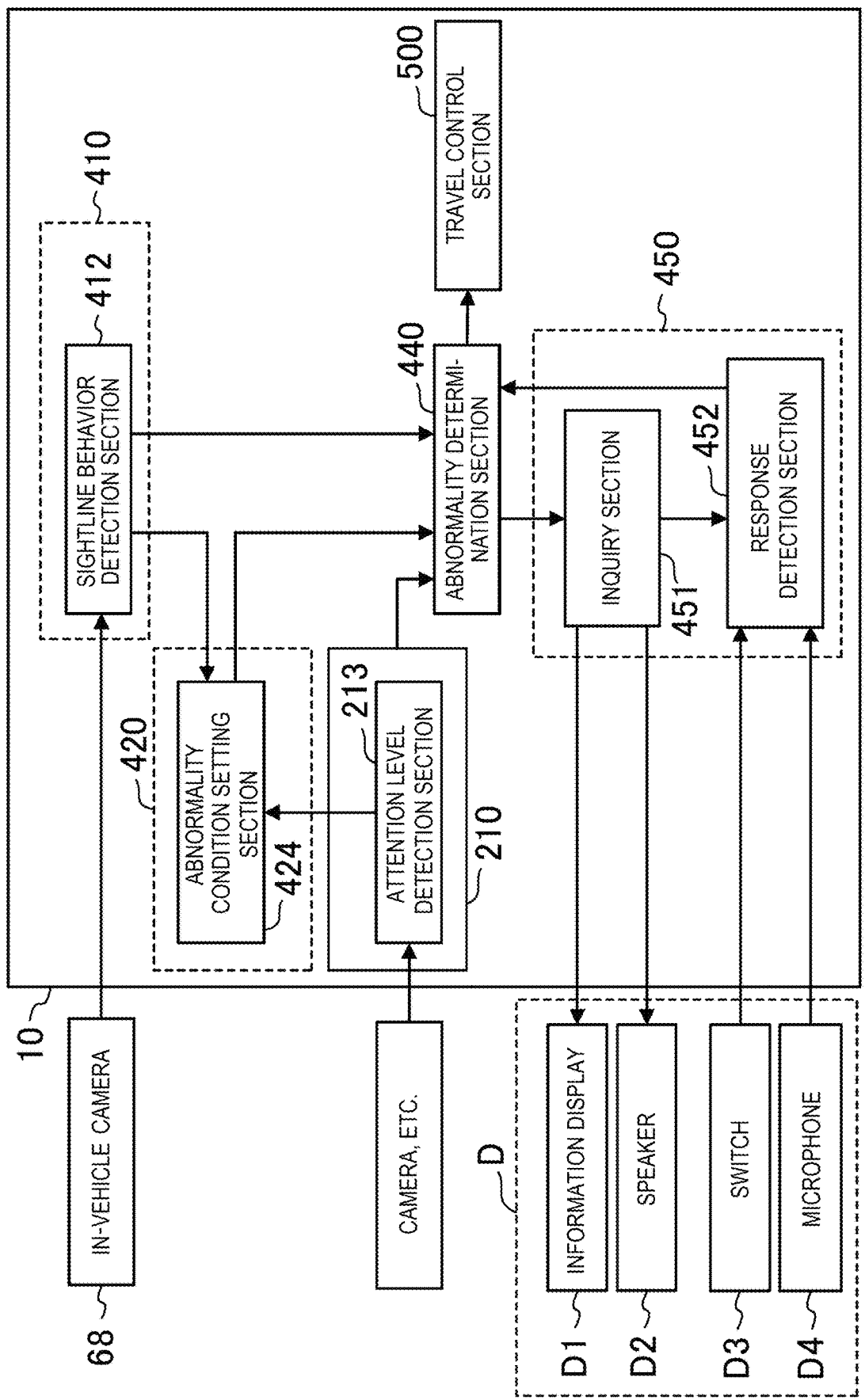
FIG. 11 is a block diagram for illustrating the detecting operation in the involuntary function level.

A description will be made on a detection operation example of the involuntary function level related to the sightline behavior with reference to FIG. 11 to FIG. 13. FIG. 11 is a block diagram for illustrating the detection operation of the involuntary function level. The blocks used for the description are extracted from the configuration illustrated in FIG. 5, and internal blocks are added when necessary. More specifically, in the example illustrated in FIG. 11, the driving scene recognition section 210 includes an attention level detection section 213. The involuntary function detection section 420 includes an abnormality condition setting section 424. In addition, as described above, the driver behavior recognition section 410 includes the sightline behavior detection section 412. The response checking section 450 includes the inquiry section 451 and the response detection section 452.

In FIG. 11, the sightline behavior detection section 412 calculates the behavior of the driver's sightline (for example, a saccade) from the image captured by the in-vehicle camera 68. The saccade is saccadic motion of the eyeballs occurred when the person (for example, the driver) intentionally moves his/her sightline. More specifically, the saccade is the motion of the eyeballs to move the sightline from a focus point at which the sightline stays for a specified time to a next focus point. In this example, the sightline behavior detection section 412 executes sightline detection processing on the image data, which is acquired by the in-vehicle camera 68, to detect the driver's sightline, and detects the saccade of the driver based on movement of the driver's sightline. This sightline detection processing may be processing that is executed by using a learning model generated by deep learning (a learning model for detecting the sightline), or may be processing that is executed by using a well-known sightline detection technique.

The attention level detection section 213 detects an attention level in the external environment of the vehicle by using the data that is acquired by one or plural of the external cameras 61, the radars 62, the position sensor 63, the external communication device 65, and the vehicle behavior estimation section 230. The attention level is an index that indicates the number of attention points (attention points to be checked by the driver of the vehicle during the travel) in the exterior environment of the vehicle. As the number of the attention points is increased in the external environment of the vehicle, the attention level in the external environment of the vehicle is increased. The detection result by the attention level detection section 213 is transmitted to the abnormality condition setting section 424. Examples of the attention point are a point where running of the movable object into the road is predicted and a point where the object that can be the obstacle for the host vehicle exists.

The abnormality condition setting section 424 sets an abnormality condition that is used for the determination on the driver abnormality by the abnormality determination section 440. In this example, the abnormality condition setting section 424 sets a threshold that is included in the abnormality condition based on the saccade of the driver detected by the sightline behavior detection section 412.

Figure 20:
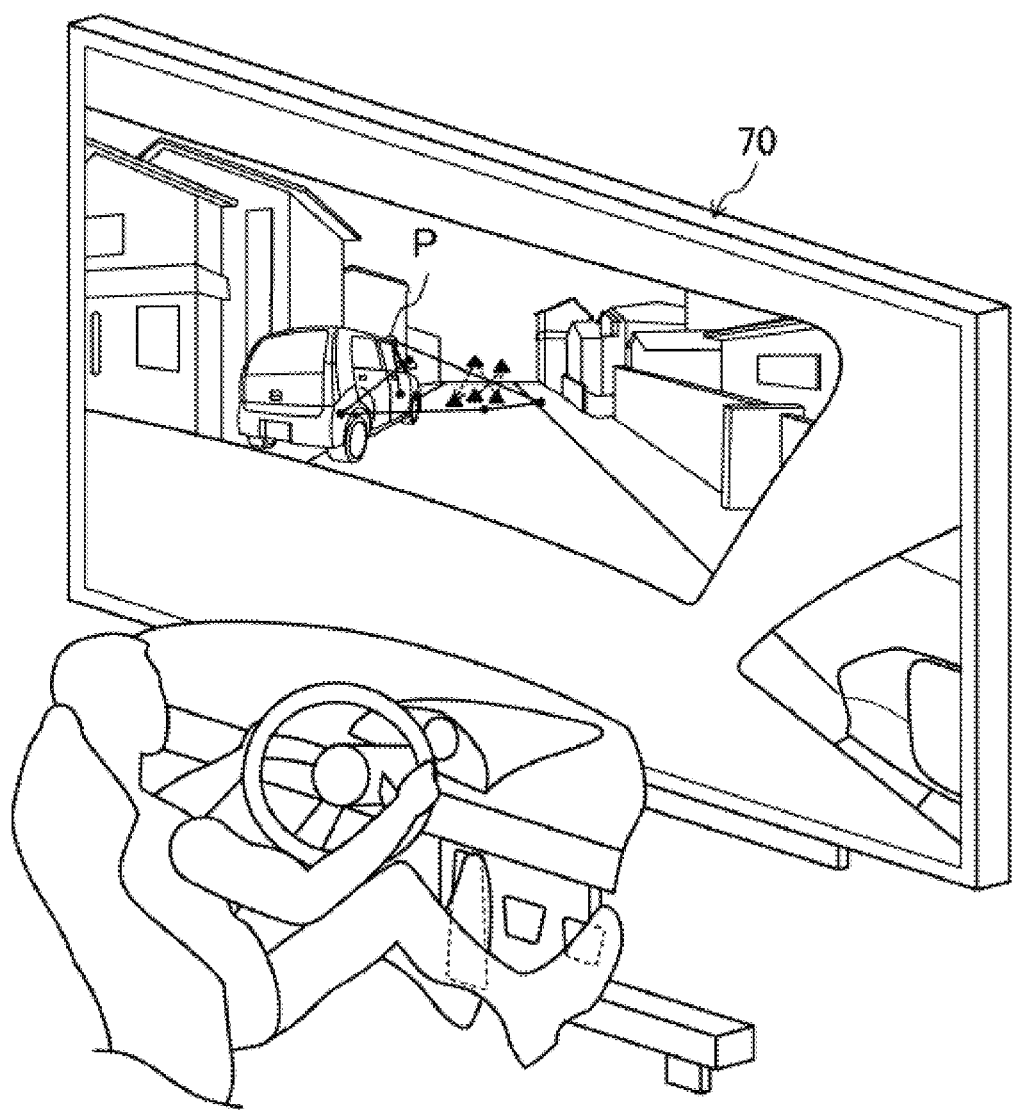
FIG. 20 is a view illustrating an example of an experiment result using a driving simulator.
Figure 21:
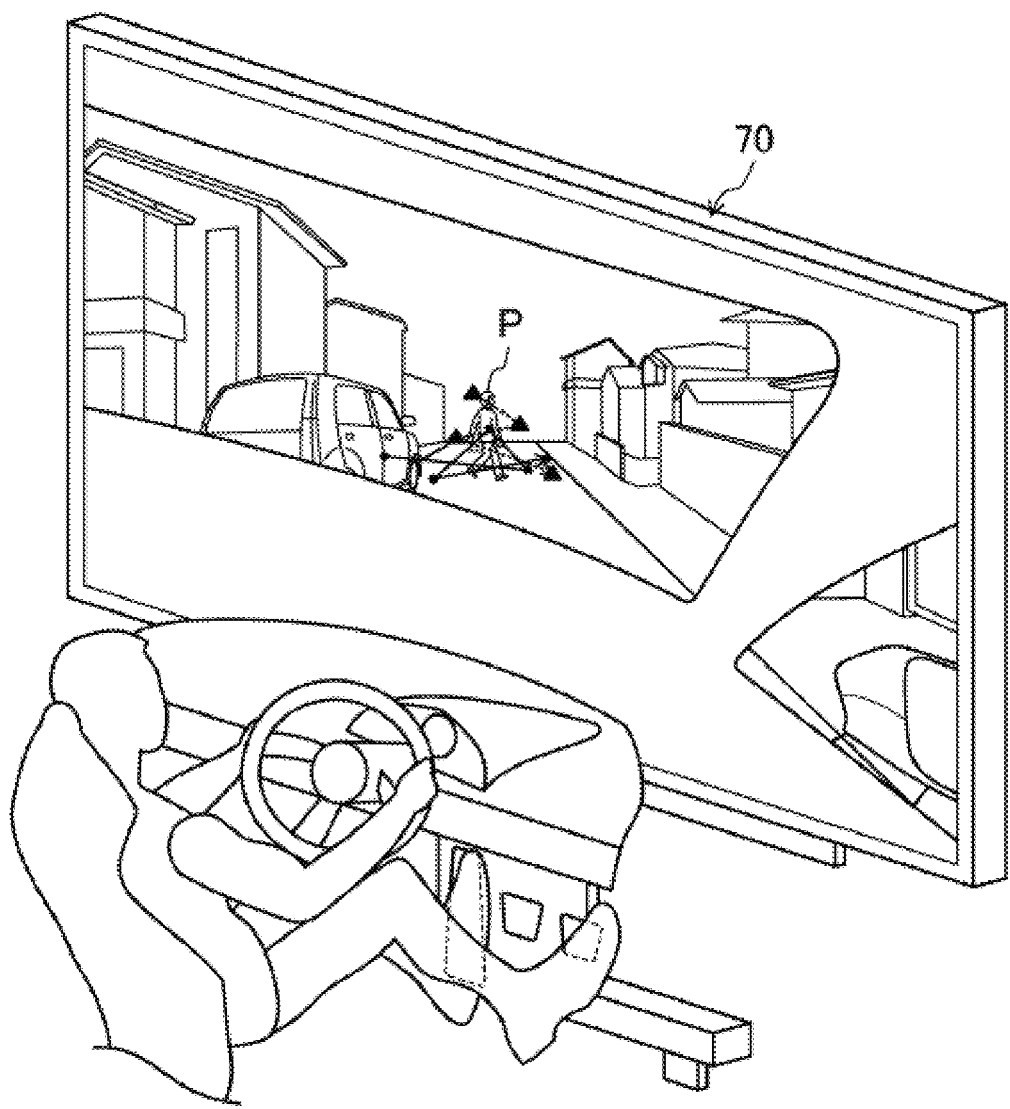
FIG. 21 is a view illustrating an example of the experiment result using the driving simulator.

As described in the column of the sightline behavior in FIG. 14, in the case where the vehicle travel state corresponds to "AVOIDANCE OF DANGER", the detection result of the sightline behavior is not adopted for the driver abnormality determination (see C2 in FIG. 14). This is based on such knowledge of the inventors that "in the case where the vehicle is avoiding danger, a difference in the behavior of the driver's sightline (particularly, the saccade amplitude) hardly occurs between the abnormal time and the normal time", and such knowledge is acquired from the experiment using the driving simulator 70. FIG. 14 illustrates the one example. Meanwhile, as illustrated in FIGS. 20, 21, which will be described below, such an evaluation item is present that the behavior of the driver's sightline differs between the abnormal time and the normal time in a driving scene where the vehicle is avoiding the danger. Such an evaluation item may be adopted for the driver abnormality determination. The same applies to the other items in FIG. 14. That is, FIG. 14 merely provides the example and thus has no intent at all that "the items indicated by "–" in FIG. 14 are not adopted for the driver abnormality determination".

(Detection Processing of Saccade Amplitude)

Next, a description will be made on operation of the abnormality determination section 440 herein with reference to FIG. 12.

Figure 12:
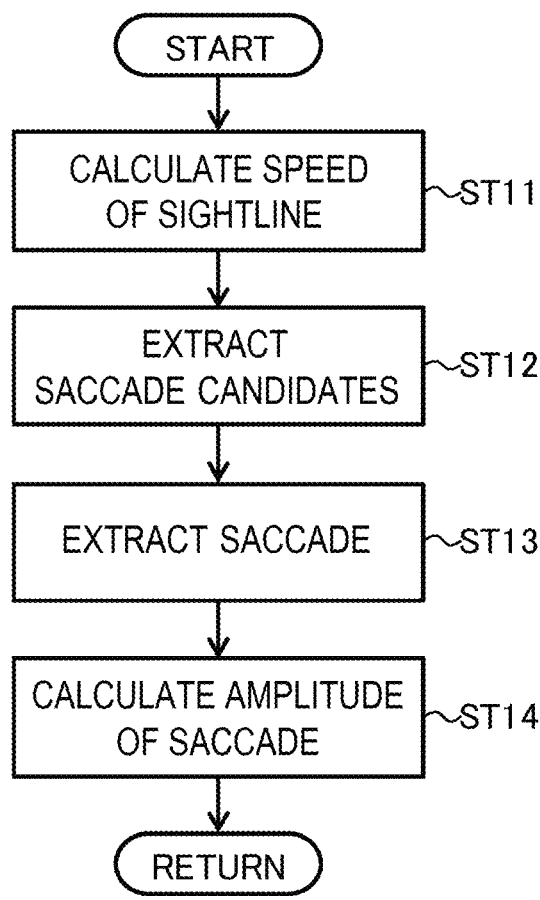
FIG. 12 is a flowchart for illustrating saccade detection processing.

First, the sightline behavior detection section 412 sets a first period P1 in which the saccade amplitude is detected, and executes processing illustrated in FIG. 12 (steps ST11 to ST14) every time the first period P1 is set.

-Step ST11-

The sightline behavior detection section 412 detects the driver's sightline. For example, the sightline behavior detection section 412 detects the driver's pupils from the image (the image data) acquired by the in-vehicle camera 68, and detects the driver's sightline based on the detected pupils. Then, the sightline behavior detection section 412 calculates, from the driver's sightline, a speed of the driver's sightline based on a temporal change in a moving distance of the driver's sightline.

-Step ST12-

Next, the sightline behavior detection section 412 extracts a saccade candidate that is a candidate for the saccade based on the moving speed of the sightline. For example, the sightline behavior detection section 412 extracts, as a "gaze period", a period in which a state where the moving speed of the sightline is lower than a predetermined speed threshold (for example, 40 deg/s) continues for a predetermined stagnation time (for example, 0.1 second). Then, of the movement of the sightline in a period between the two adjacent gaze periods, the sightline behavior detection section 412 extracts, as the "saccade candidate", the movement of the sightline, the moving speed of which is equal to or higher than the speed threshold (for example, 40 deg/s), and the moving distance of which is equal to or longer than a predetermined distance threshold (for example, 3 deg).

-Step ST13-

Next, the sightline behavior detection section 412 derives a regression curve, which is based on the plural saccade candidates, by a method of least squares, draws a reference curve in each of increased/reduced directions of the moving speed of the sightline with respect to the regression curve, and sets a portion between the reference curves as a saccade range. Then, of the plural saccade candidates, the sightline behavior detection section 412 extracts, as the saccade, the saccade candidate included in the specified saccade range, but does not extract, as the saccade, the saccade candidate not included in the saccade range.

-Step ST14-

Next, the sightline behavior detection section 412 calculates a saccade amplitude ds in the first period P1. More specifically, the sightline behavior detection section 412 calculates an average value of the saccade amplitude ds included in the first period P1 as the "saccade amplitude ds in the first period P1".

(Experiment 1 Conducted By Inventors of the Present Application)

The inventors of the present application conducted an experiment as follows to examine a relationship between the driver state and the behavior (particularly, the motion of the sightline) of the driver.

First, to collect data on a sudden abnormal state, a patent having a symptom of epilepsy (hereinafter described as an "epilepsy patent") was selected as a subject. Then, the subject experienced the virtual driving operation of the vehicle by using the driving simulator 70 (see FIG. 20). More specifically, the subject watched a video during the travel of the vehicle (a video that showed the external environment of the vehicle seen from the inside of the vehicle) by using the driving simulator 70, and behavior of the subject during the experiment was observed. In this way, the behavior of the subject while driving the vehicle was spuriously observed. In this experiment, a camera was installed in front of the subject who watched the video during the travel of the vehicle, and the camera was set such that the subject's eyeballs were included in an imaging area.

Then, image data acquired by the camera was subject to the sightline detection processing to detect the subject's sightline. In addition, the subject's sightline, which was acquired by the sightline detection processing, was subject to saccade detection processing. In this way, the saccade of the subject was detected, and the saccade amplitude in the specified period was calculated. These types of the processing are the same as the processing executed by the sightline behavior detection section 412.

The experiment described so far was conducted on the plural subjects. Of these plural subjects, there was a subject who had an attack of epilepsy during the experiment. Thus, data on the subject during the attack of the epilepsy could be acquired.

As illustrated in FIG. 13, in a period from a period immediately before onset of the attack of epilepsy to a time point at which the attack of epilepsy occurred (approximately 3915 seconds to approximately 3930 seconds in FIG. 13), the amplitude and a frequency of the saccade of the subject were further reduced to zero. This state where the amplitude and the frequency of the saccade of the subject are zero continues for 10 seconds or longer.

For example, the abnormality determination section 440 stores the saccade amplitude ds in the first period P1, in which the driver state is the normal state, in the storage section 300, and sets the threshold for a saccade amplitude abnormality determination at 50% of the amplitude (for example, an average value) in the normal state. Then, for example, when the saccade amplitude ds of the driver becomes equal to or smaller than the threshold for a specified period in a consecutive manner, the abnormality determination section 440 determines that the driver is abnormal.

<<Abnormality Determination Processing>>

As described above, the target function level in the periods T12, T23 is only the involuntary function level. Thus, in the periods T12, T23, the abnormality determination section 440 determines the driver abnormality based on the involuntary function level, which is output from the involuntary function detection section 420.

Then, when confirming the driver abnormality, the abnormality determination section 440 instructs the travel control section 500 to execute control for making the vehicle A automatically evacuate to the road shoulder for the stop. As described above, when determining the abnormality, the abnormality determination section 440 may check the driver's response via the response checking section 450, and then may finally determine the driver abnormality.

<Detection Processing of Base Function Level>

A description will herein be made on a detection operation example of the base function level related to the driving operation among the detection items of the base function level related to the base action illustrated in the middle portion in FIG. 6A and the middle portion in FIG. 6B with reference to the drawings.

<<Driving Operation>>

FIG. 15 is a block diagram for illustrating the detection operation of the base function level. The blocks used for the description are extracted from the configuration illustrated in FIG. 5, and internal blocks are added when necessary. More specifically, in the example illustrated in FIG. 15, the driver behavior recognition section 410 includes a driving operation estimation section 414, a driving operation learning model 415, and a driving operation estimation model 416. The base function detection section 435 includes an estimation error calculation section 436. For example, the driving operation learning model 415 and the driving operation estimation model 416 are stored in the storage section 300.

In FIG. 15, the driving operation estimation section 414 receives driving operation information recognized by the driving operation recognition section 220, the driving scene information recognized by the driving scene recognition section 210, and the vehicle behavior data generated by the vehicle behavior estimation section 230. For example, the driving scene information includes information on the traveling lane, information on a speed limit, and the positional information of the vehicle. As described above, the vehicle behavior data includes vehicle speed information. During the travel of the vehicle A, the driving operation estimation section 414 uses the driving operation learning model 415, which is generated by deep learning, to generate and accumulate a model parameter indicative of a driving characteristic of the usual driving operation by the driver from the driving operation information, the driving scene information, and the vehicle behavior data described above.

Furthermore, during the travel of the vehicle A, the driving operation estimation section 414 uses the driving operation estimation model 416, which is generated by deep learning, to estimate the driving operation by the driver of the moment from the driving operation information, the driving scene information, and the vehicle behavior data, and the model parameter described above. That is, the driving operation estimation section 414 estimates, from the usual driving operation by the driver, what type of the driving operation the driver will perform in the normal state (the healthy state) in the driving scene of the moment. The driving operation estimation section 414 outputs an estimation value of the driving operation (hereafter referred to as an operation estimation value) to the estimation error calculation section 436.

Figure 16A:
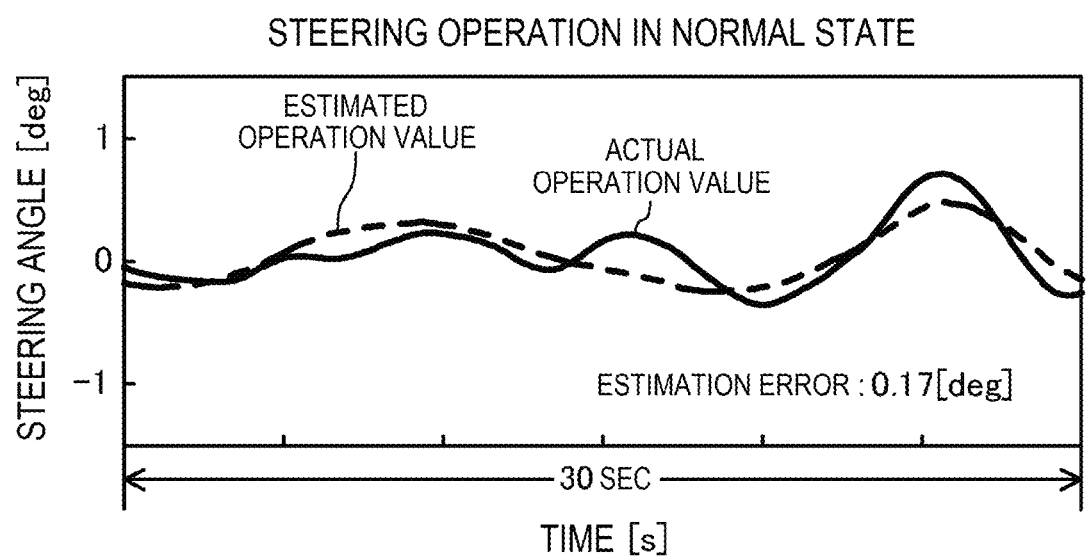
FIGS. 16A and 16B includes graph in each of which steering operations by a normal state and an abnormal state.
Figure 16B:
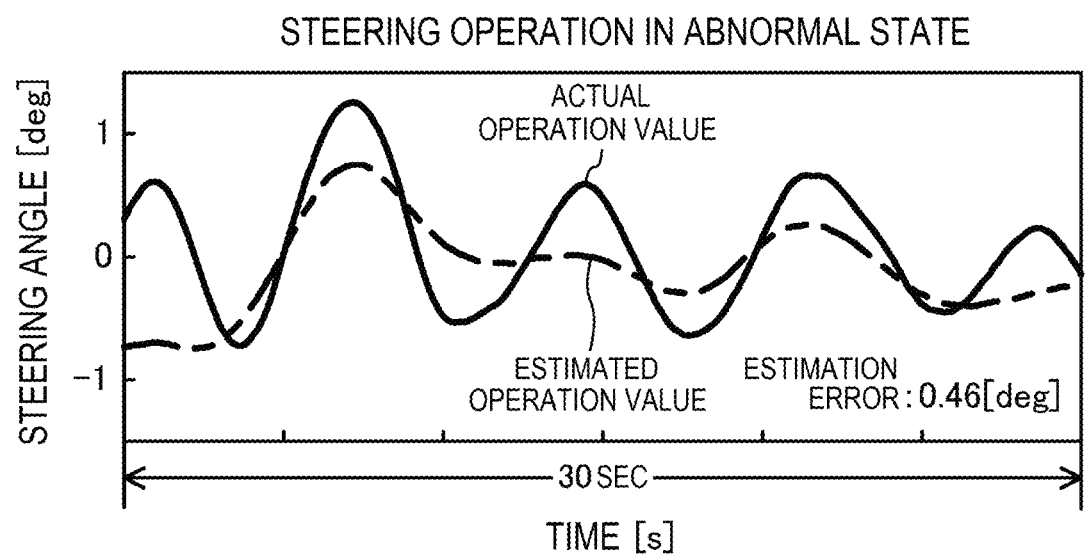

The estimation error calculation section 436 compares the above operation estimation value to a value that is based on the actual driving operation (hereinafter referred to as an actual operation value), calculates a degree of deviation from the usual operation, and outputs the degree of the deviation as an operation deviation degree to the abnormality determination section 440. Regarding the steering operation, FIGS. 16A and 16B illustrate the operation estimation value and the actual operation value of each of the steering operation in the normal state and the steering operation in the abnormal state in an overlapping manner. FIGS. 16A and 16B illustrate 30 seconds of driving data in the driving scene in each of the normal state and the abnormal state.

The abnormality determination section 440 determines whether the sign of the driver abnormality is present based on whether the operation deviation degree, which is received from the estimation error calculation section 436, satisfies a specified criterion. Although a method for setting the specified criterion is not particularly limited, for example, such a criterion is set that it is determined that the sign of the driver abnormality is present in the case where, as the steering operation deviation degree, an average of the steering estimation error in the specified period (30 seconds in FIG. 16) is equal to or larger than 0.4 [deg]. Alternatively, instead of providing the simple threshold, a divergence score that is based on a divergence amount from the steering estimation error may be calculated, and the base function level may be calculated based on the divergence score.

<<Abnormality Determination Processing>>

As described above, the target function levels in the periods T22, 124, T32 in FIG. 4 are the base function level and the involuntary function level. Thus, in the periods T22, T24, T32, the abnormality determination section 440 determines whether the involuntary function level, which is output from the involuntary function detection section 420, and the base function level, which is output from the base function detection section 435, including the combination thereof match a specified condition. In this case, as illustrated in FIG. 14 described above, the combination of the indices may be determined according to the driving scene. Alternatively, the level value of each of the function levels may be scored or added, or the weighted average of such values may be calculated to set the specified condition for the total score including some or all of the scores selected from the base function level and the involuntary function level.

As illustrated in FIG. 17, there is a case where the declining order of the functions is known according to the type of the illness or the like. In such a case, the specified condition may be set stepwise in consideration of the declining order of the functions. Then, the driver abnormality may be determined by determining whether the function level matches the set condition.

For example, CASE B in FIG. 17 is a case where the involuntary function is declined after the decline of the base function. An example that corresponds to such a case is that impairment of the motor functions of the hands and feet is developed due to infarction of thalamus or the like, and is further progressed to cause a posture maintenance difficulty state (for example, of an unbalanced trunk, or the like). In this case, the decline in the base function level related to the driving operation is detected. Thereafter, instability of the head behavior appears. That is, the decline in the involuntary function level is detected. Accordingly, in consideration of this order, when the base function level is declined to be equal to or lower than the specified determination criterion, the abnormality determination section 440 may lower the determination threshold for the involuntary function level, to facilitate the abnormal determination of the involuntary function level.

For example, CASE D in FIG. 17 is a case where the base function is declined after the decline of the involuntary function. As such a case, for example, there is a case where the head behavior becomes unstable in the driving scene as that in the period T23 to 124 in FIG. 4 (a situation where the determination accuracy of the involuntary function level is likely to be higher than that of the base function level). More specifically, from the knowledge of the inventors, in the case where the driver suffers from the illness, the function related to the high-order action started being declined first, and thereafter, the decline in the function related to the base action and the decline in the function related to the involuntary action gradually occur. However, in the driving scene as that in the periods T23 to 124 in FIG. 4, there is a case where the sign of the abnormality of the involuntary function is detected prior to the driving function. Thus, in such a case, when the driving function detection section 430 detects that the head behavior becomes unstable, the abnormality determination section 440 may lower the determination threshold for the base function level. In this way, the abnormality of the base function level on a curved road or the like thereafter is more likely to be determined. As a result, it is possible to simultaneously discover the driver abnormality early and make the determination with the high degree of accuracy. At this time, the instability of the head behavior and the determination threshold of the base function level are examples of the determination criteria.

<Detection Processing of Predictive Function Level>

A description will herein be made on a detection operation example of the predictive function levels related to the sightline behavior and the driving operation among the detection items of the predictive function level related to the base action illustrated in the upper portion in FIG. 6A and the upper portion in FIG. 6B with reference to the drawings.

<<Sightline Behavior and Driving Operation>>

A block diagram having a similar configuration to that in FIG. 11 can be used for the detection operation of the predictive function level related to the sightline behavior. Thus, a description herein will be centered on different points from the detection operation of the involuntary function level. More specifically, the base function detection section 435 is provided at the position of the involuntary function detection section 420 in FIG. 11.

The sightline behavior detection section 412 herein calculates a direction of the driver's sightline from the image of the driver's eyeballs captured by the in-vehicle camera 68. For example, the sightline behavior detection section 412 sets a state where the driver looks at a lens of the in-vehicle camera 68 as a reference, detects a change in the driver's pupils from the reference, and thereby calculates the direction of the driver's sightline. The sightline direction calculated by the sightline behavior detection section 412 is transmitted to the predictive function detection section 431. Similarly, the driving scene recognized by the driving scene recognition section 210 is transmitted to the predictive function detection section 431.

The predictive function detection section 431 executes processing to superpose the sightline, which is calculated by the sightline behavior detection section 412, onto the driving scene recognized by the driving scene recognition section 210.

(Experiment 2 Conducted by Inventors of the Present Application)

Figure 18:
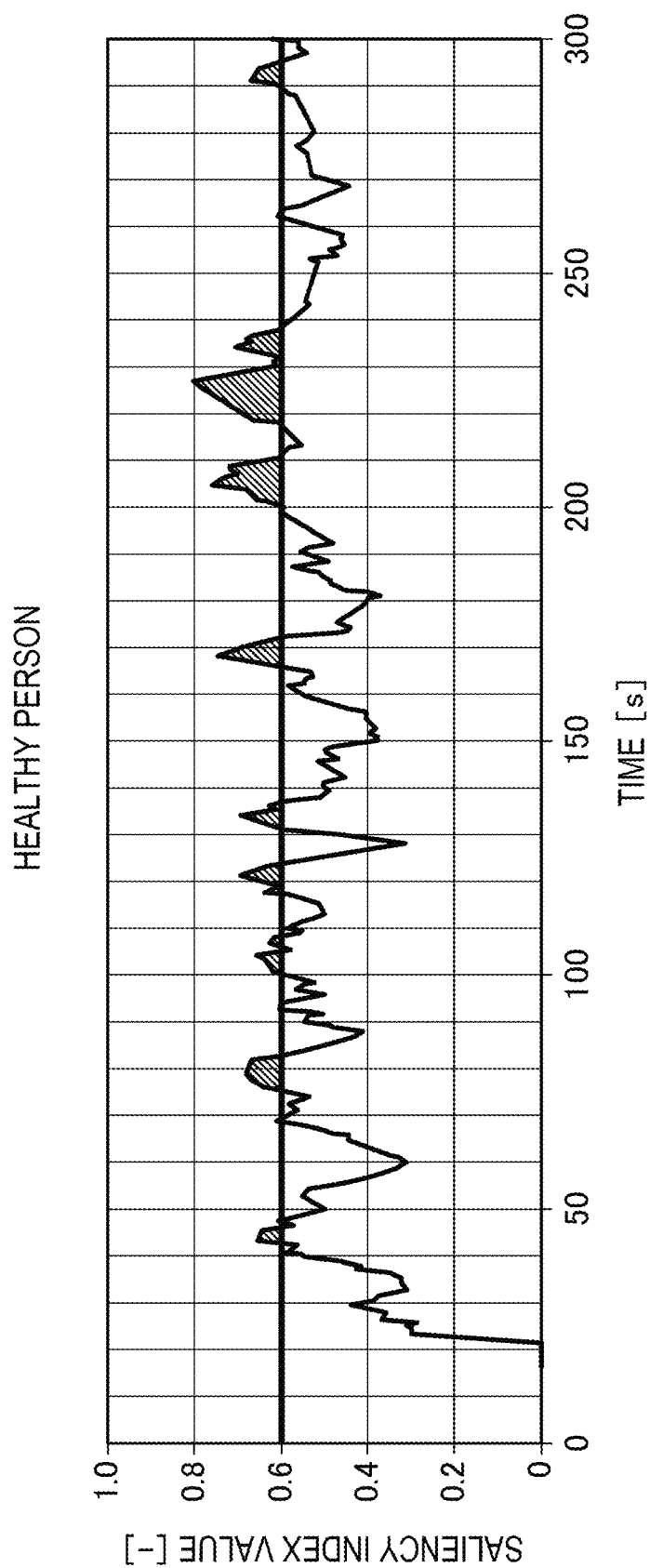
FIG. 18 is a graph exemplifying a change in a saliency index value of the healthy person.
Figure 19:
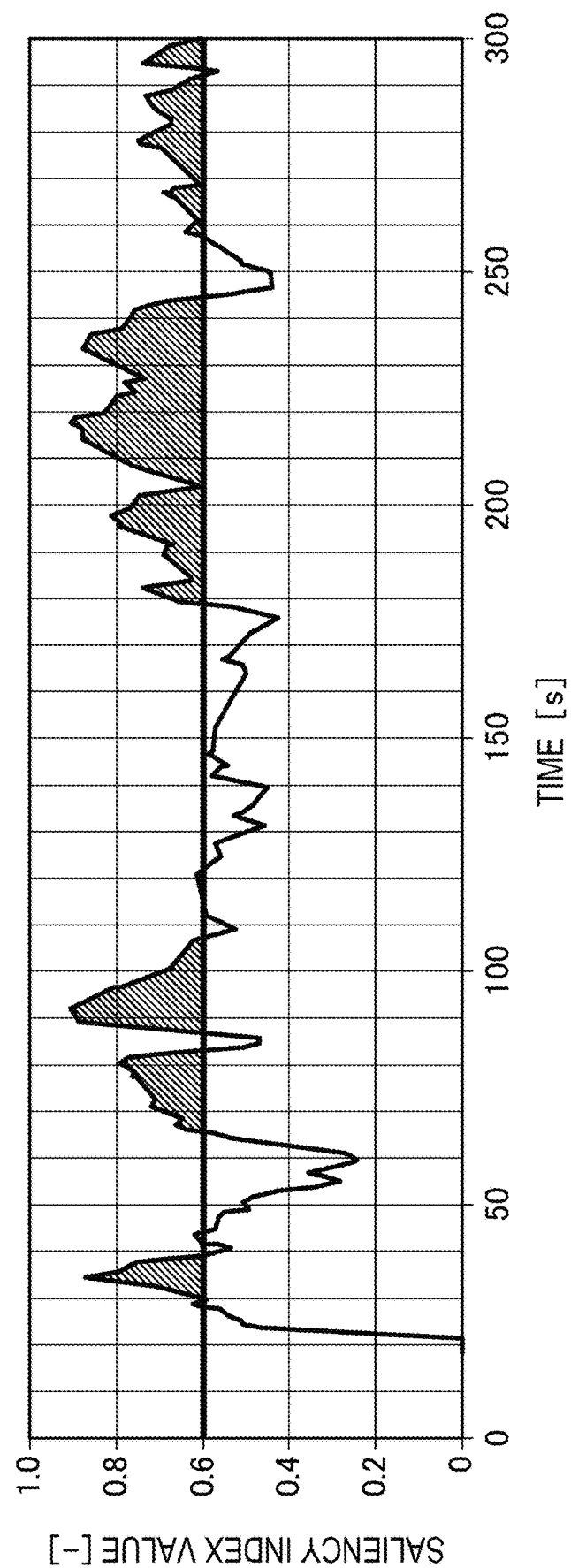
FIG. 19 is a graph exemplifying a change in a saliency index value of an attention impairment patent.

In each of FIGS. 18, 19, the driver's sightline was detected by using the driving simulator 70 and was plotted as a temporal change in a saliency index. FIG. 18 illustrates a measurement result of the healthy person, and FIG. 19 illustrates a measurement result of the dysfunction patient. Since the travel speeds differ from each other, time axes and travel positions do not always match.

The saliency index is an index, a numerical value of which is increased with an increase in noticeability of a high saliency area.

In the examples illustrated in FIGS. 18, 19, for example, the abnormality condition setting section 424 sets, as a specified condition, a threshold at 0.6 where the noticeability of the high saliency area is determined to be relatively high, and sets an area where the saliency index exceeds the threshold with respect to a specified time. In such a case, in the case where the area (an area of regions with diagonal lines) where the saliency index exceeds 0.6 exceeds the specified threshold, the abnormality determination section 440 determines that the driver is abnormal (for example, suffers from the attention dysfunction) or has the sign of the abnormality. That is, the abnormality determination section 440 determines that the driver is abnormal or has the sign of the abnormality.

(Experiment 3 Conducted by Inventors of the Present Application)

In each of FIGS. 20 and 21, the driver's sightline is detected by using the driving simulator 70, and a result of the superposition of the driver's sightline onto the image of the driving scene is illustrated. The similar processing is executed by the predictive function detection section 431.

Figure 22A:
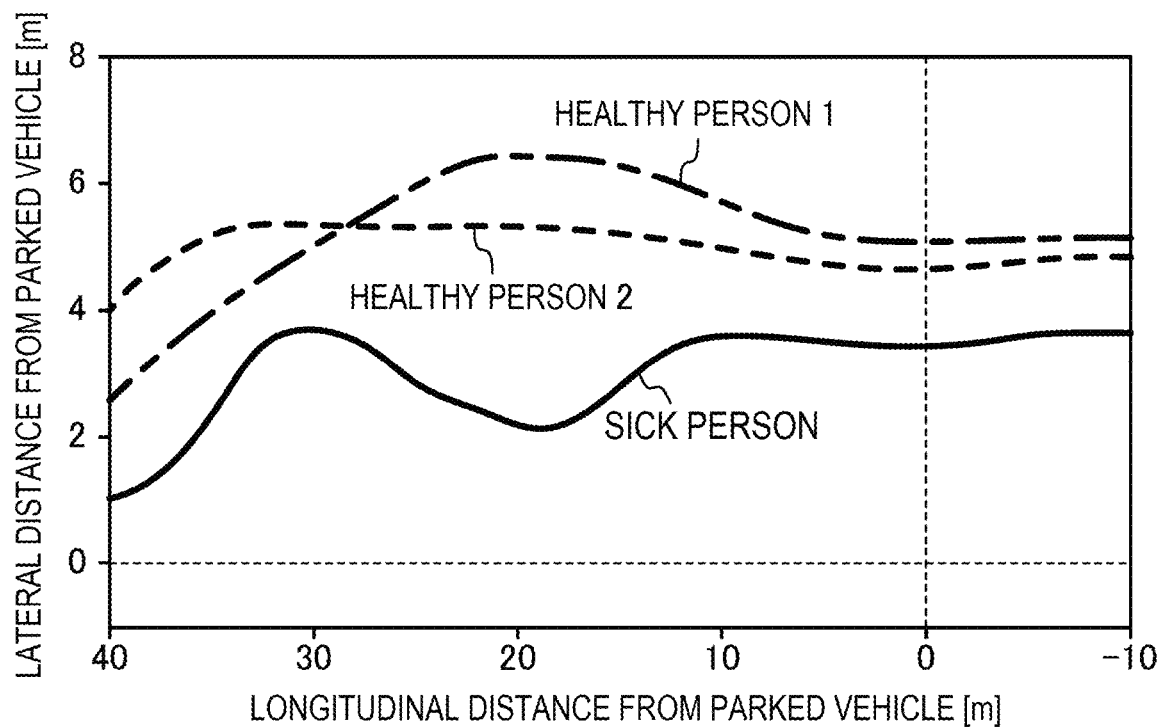
FIGS. 22A and 22B include graphs illustrating examples of the experiment result using the driving simulator.
Figure 22B:
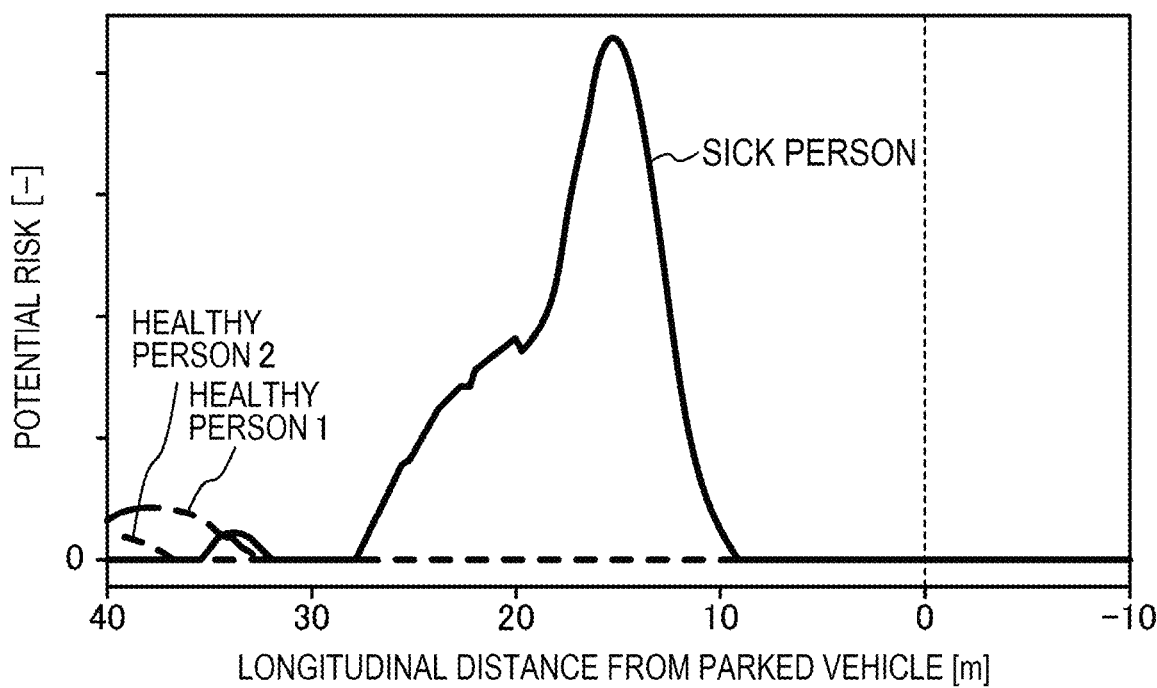

In FIG. 20, an example of the motion of the sightline in the normal time and the abnormal time in the case where the pedestrian shows up from a hidden position behind a vehicle is plotted. In FIG. 21, solid lines represent the motion of the sightline in the normal time, and broken lines represent the motion of the sightline in the abnormal time. In the normal time, the driver pays attention to the position where the pedestrian shows up several seconds (for example, two seconds) before the pedestrian actually shows up. Meanwhile, in the abnormal time, the driver pays attention to the road ahead and gazes at the pedestrian after the pedestrian shows up. In such a case, as illustrated in FIG. 22A, the sick person tends to approach the obstacle such as the parked vehicle in comparison with the healthy person, and thus the potential risk thereof is increased as illustrated in FIG. 22B. Thus, the predictive function detection section 431 calculates a risk value corresponding to a distance between the host vehicle and the obstacle, for example, and determines the driver abnormality based on the risk value.

Here, the predictive function detection section 431 may execute similar processing to the above-described "detection processing of the driving operation of the base function level". More specifically, for example, the predictive function detection section 431 generates a model parameter of the usual behavior of the driver's sightline. Then, from the driving operation information, the driving scene information, the vehicle behavior data, and the model parameter, the predictive function detection section 431 estimates the behavior of the driver's sightline in the normal state (the healthy state) in the driving scene of the moment. Then, the predictive function detection section 431 calculates an estimation error between the above estimated sightline behavior and the actual sightline behavior, and outputs the estimation error to the abnormality determination section 440. Thereafter, the abnormality determination section 440 may determine whether the driver has the sign of the abnormality based on whether the operation deviation degree received from the predictive function detection section 431 satisfies the specified criterion. As the model parameter, a general normal driver model may be used.

<<Abnormality Determination Processing>>

As described above, the target function levels in the periods T11, T13, T21, T25, T31, T33 in FIG. 4 are the predictive function level, the base function level, and the involuntary function level. Thus, in these periods, the abnormality determination section 440 determines whether the involuntary function level, which is output from the involuntary function detection section 420, the base function level, which is output from the base function detection section 435, and the predictive function level, which is output from the predictive function detection section 431, including the combination thereof match the specified condition. In this case, as illustrated in FIG. 14 described above, the combination of the indices may be determined according to the driving scene. In addition, the level value of each of the function levels may be scored or added, or the weighted average of such values may be calculated to set the specified condition for the total score including some or all of the scores selected from the base function level and the involuntary function level.

As described above, from the knowledge of the inventors, in the case where the driver suffers from the illness, the function related to the high-order action started being declined first, and thereafter, the decline in the function related to the base action and the decline in the function related to the involuntary action gradually occur. Thus, as in the periods T11, T13, T21, T25, T31, T33, in the case where the plural target function levels (the predictive function level, the base function level, and the involuntary function level) are present, and plural detection means can be used as in the case of "FOLLOWING TRAVEL" in FIG. 14, the abnormality determination section 440 may determine the abnormality by preferentially using the output from the predictive function detection section 431. In addition, in the case where each of the plural function levels is scored, and the determination is made based on the total score (the combination), the output from the predictive function detection section 431 may be set to have a relatively higher score than the detection result of the other function levels.

As illustrated in FIG. 17, there is the case where the declining order of the functions is known according to the type of the illness or the like. In such a case, the specified condition may be set stepwise in consideration of the declining order of the functions. Then, the driver abnormality may be determined by determining whether the function level matches the set condition. The declining order of the functions may be stored as a table in the storage section 300 or the like in advance.

For example, CASE A in FIG. 17 is a case where the base function is declines after the predictive function has declined. An example that corresponds to such a case is that, for example, the driver suffers from the attention dysfunction due to infarction of the frontal cortex, which is progressed to impair the motor functions of the hands and the feet due to the infarction of the thalamus or the like. In such a case, the sightline behavior is possibly changed, and then unstable driving operation is possibly performed. In this case, the decline in the predictive function level related to the sightline behavior is detected. Thereafter, instability of the driving operation appears. That is, the decline in the base function level is detected. Accordingly, in consideration of this order, when the predictive function level related to the particular item is declined to be equal to or lower than the specified determination threshold, the abnormality determination section 440 may lower the determination threshold of the base function level corresponding to the predictive function, to facilitate the abnormal determination of the involuntary function level. At this time, the determination threshold of the predictive function level and the determination threshold of the base function level are examples of the determination criteria.

For example, CASE C in FIG. 17 is a case where the involuntary function declines after the predictive function has declined. An example that corresponds to such a case is a case where, for example, the driver suffers from the attention dysfunction due to the infarction of the frontal cortex, which is further progressed to cause the posture maintenance difficulty state (for example, of the unbalanced trunk, or the like) due to the infarction of the thalamus. In this case, the predictive function level of the sightline behavior is declined, and the unstable head behavior occurs thereafter, that is, the decline in the involuntary function level is detected. Accordingly, in consideration of this order, when the particular predictive function level is declined to be equal to or lower than the specified determination threshold, the abnormality determination section 440 may lower the determination threshold of the involuntary function level corresponding to the predictive function, to facilitate the abnormal determination of the involuntary function level.

<<Abnormality Determination Processing>>

Figure 23:
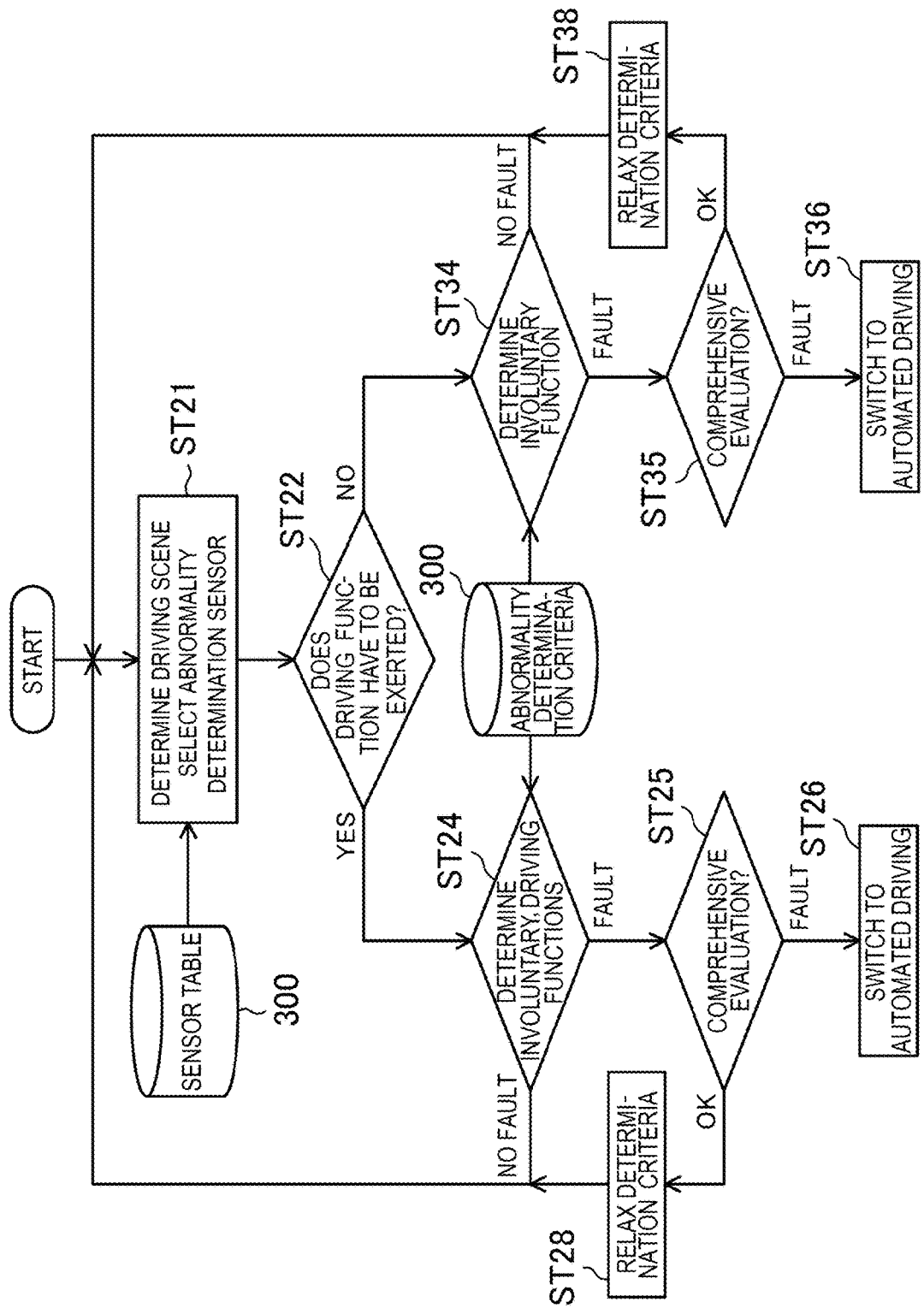
FIG. 23 is a flowchart illustrating driver abnormality determination operation.

The description has been made so far on the driver abnormality determination processing by the vehicle controller 10 in a manner to link such processing with the detection processing of each of the function levels. A description will herein be made on a series of driver abnormality determination operation with reference to FIG. 23 from a perspective of the driver abnormality determination. The block diagram, which will be used for the driver abnormality determination, is the same as those in the description so far including FIG. 5, and the description on the configuration will not be repeated.

-Step ST21-

As described above, the driving scene recognition section 210 recognizes the driving scene of the vehicle based on the external environment information that is acquired by the external environment information acquisition device 60. The abnormality determination section 440 refers to the sensor table in the storage section 300 and selects, from the above-described sensor group, the abnormality determination sensor that corresponds to the driving scene of the vehicle recognized by the driving scene recognition section 210.

The abnormality determination sensor may be selected by the block other than the abnormality determination section 440. In addition, the block prior to the abnormality determination section 440 may stop processing related to the sensor other than the abnormality determination sensor.

-Step ST22-

The calculation processing section 100 determines whether the driving scene, which is recognized by the driving scene recognition section 210, is a driving scene in which the driving function must be executed. Whether the driving scene is the driving scene in which the driving function must be executed can be determined from whether the driver performs the driving operation, for example, based on the output of the driving operation sensor 66. The method for determining whether the driving scene is the driving scene in which the driving function must be executed is not particularly limited. For example, such a determination may be made from the travel state (the stop state) of the vehicle based on the imaging result by the external camera 61 and the information from the vehicle state sensor 64 and the like. Alternatively, such a determination may be made by monitoring the driver state using the driver state sensor 67 such as the in-vehicle camera 68. Furthermore, those methods may be combined.

For example, in a case of the driving scene as that illustrated in the period T11 in FIG. 4, the driving scene recognition section 210 determines that such a driving scene is the driving scene in which the driving function must be executed, that is, a driving scene in which the involuntary function, the base function, and the predictive function must be executed. As a result, it is determined "YES" in step ST22, and the processing flow proceeds to step ST24. This determination on the driving scene may be made by the recognition section 200 or may be made by the driver state estimation section 400.

-Step ST24-

The abnormality determination section 440 determines the driver abnormality by checking the results of the function levels of the driver, which are detected by the involuntary function detection section 420, the predictive function detection section 431, and the base function detection section 435, and the combination thereof with the specified conditions and the specified criteria. For example, as illustrated in FIG. 24, the determination criterion is provided for each of the functions of the involuntary function detection section 420, the predictive function detection section 431, and the base function detection section 435 (hereinafter also simply referred to as each of the functions). The abnormality determination section 440 determines whether each of the functions satisfies the respective determination criterion. FIG. 24 illustrates an example in which the determinations on the evaluation items, which have been described so far, are made.

FIG. 24 illustrates, as the exemplary evaluation items of the involuntary function, the periodicity characteristic amount (the head behavior) and the saccade amplitude (the sightline behavior). In an initial state (the normal state of the driver), the determination criterion for the periodicity characteristic amount is based on the above-described determination line LTH (see FIG. 10). The determination criterion for the saccade amplitude is set such that, when a state where the saccade amplitude of the driver is less than 50% of the average for the normal driving by the driver continues for a specified time, it is determined that the saccade amplitude of the driver is abnormal. FIG. 24 illustrates, as the exemplary evaluation item of the base function, the steering operation deviation degree (the driving operation). The determination criterion for the steering operation deviation degree is set such that, when the estimation error is equal to or larger than 0.4 [deg], it is determined that the steering operation of the driver is abnormal (see FIG. 16). FIG. 24 illustrates, as the exemplary evaluation items of the predictive function, the saliency index (the sightline behavior) and the distance from the obstacle (the driving operation). In the case where an area, in which the saliency index exceeds 0.6, is equal to or larger than X (X is a positive number), it is determined that the sightline behavior of the driver is abnormal. Regarding the distance from the obstacle, when the risk value is equal to or higher than Y (Y is a positive value), it is determined that the driving operation of the driver is abnormal. These evaluation items and determination criteria are stored in the storage section 300, for example.

In the example illustrated in FIG. 24, in the period T11, all the items (functions) function normally. Accordingly, the abnormality determination section 440 determines that "no fault item" (described as "NO FAULT" in FIG. 23), and the processing flow returns to step S21.

For example, in the case of the period T11 in FIG. 4, the vehicle A travels on the town road. Thus, the driving scene thereof changes over time. In the case where it is assumed that the normal driver state continues in the period T11, the processing in ST21, ST22, and ST24 described above is repeatedly executed while the abnormality determination sensor, which is adopted according to the driving scene, is changed as needed.

-Step ST21-

When the processing flow returns to step ST21, the recognition result of the vehicle driving scene by the driving scene recognition section 210 is updated. In addition, the abnormality determination section 440 refers to the sensor table in the storage section 300, and selects the abnormality determination sensor that corresponds to the updated driving scene. Since the vehicle A stops in the period T12, the driving operation sensor 66 is not adopted as the abnormality determination sensor (see FIG. 14 and FIG. 24). Furthermore, as illustrated in FIG. 24, the measurement item used to measure the predictive function is not used for the driver abnormality determination. Accordingly, for example, in the case where the sensor used to measure the saccade amplitude differs from the sensor used to measure the saliency index, the sensor used to measure the saliency index in the period T12 may not be adopted as the abnormality determination sensor.

-Step ST22-

In FIG. 24, it is assumed that the driving scene in the next period T12 is not the driving scene in which the driving function must be executed, that is, it is difficult to detect the driving function, and only the involuntary function is the determination target. In this case, it is determined "NO" in step ST22, and the processing flow proceeds to step ST34.

-Step ST34-

The abnormality determination section 440 determines whether the sign of the driver abnormality is present by checking the result of the function level of the driver, which is detected by the involuntary function detection section 420, and the combination of the measurement items for the involuntary function with the specified conditions and the specified criteria. In the example illustrated in FIG. 24, it is assumed that the saccade amplitude no longer satisfies the determination criterion in the period T12. As a result, in step ST34, it is determined that "fault item is present" (described as "FAULT" in FIG. 23), and the processing proceeds to next step ST35.

-Step ST35-

The abnormality determination section 440 integrates the measurement results by the involuntary function detection section 420 to determine the driver abnormality. That is, the abnormality determination section 440 determines whether to switch the vehicle A to the automated driving. Here, for example, in the case where both of the items, which are the periodicity characteristic amount (the head behavior) and the saccade amplitude (the sightline behavior), are fault, the abnormality determination section 440 determines that the driver is abnormal (FAULT in step ST35), and executes control to switch to the automated driving (step ST36).

In the period T12 illustrated in FIG. 24, only the saccade amplitude is fault. Thus, it is determined "OK" in step ST35, and the processing flow proceeds to step ST38.

-Step ST38-

The abnormality determination section 440 relaxes the determination criteria, which are used to determine the driver abnormality, to facilitate the determination of the driver abnormality. That is, even in a state where the driver abnormality is not determined in the normal time, the driver abnormality is determined early. The determination criterion to be changed is not particularly limited. The determination criteria for the involuntary function may be changed, or the determination criteria for the driving function (the base function and/or the predictive function) may be changed. Here, (1) in regard to the predictive function, the evaluation criterion for the saliency index is relaxed from "fault at X or larger" to "fault at X−α (a is a positive number)", and (2) in regard to the base function, the steering operation deviation degree is relaxed from "fault at 0.4 [deg] or larger" to "fault at 0.35 [deg] or larger". When the processing in step ST38 is terminated, the processing flow returns to step ST21.

-Step ST21-

When the processing flow returns to step ST21, the recognition result of the vehicle driving scene by the driving scene recognition section 210 is updated. In addition, the abnormality determination section 440 refers to the sensor table in the storage section 300, and selects the abnormality determination sensor that corresponds to the updated driving scene. Here, it is assumed that the driving scene of the vehicle is shifted to that in the period T13. Since the vehicle A travels on the town road again in the period T13, depending on the driving scene, the driving operation sensor 66 can also be adopted as the abnormality determination sensor (see FIG. 14 and FIG. 24).

-Step ST22-

In FIG. 24, the driving scene in the period T13 is a driving scene in which the driving function must be executed. Thus, it is determined "YES" in step ST22, and the processing flow proceeds to step ST24.

-Step ST24-

As described above, the abnormality determination section 440 determines the driver abnormality based on the determination items and the determination criteria in FIG. 24. Here, the determination criterion for the saliency index has been relaxed. Then, in the period T13, it is determined fault in regard to the saliency index. Here, since the abnormality determination section 440 determines that the "fault item is present" (described as "FAULT" in FIG. 23), and the processing proceeds to next step ST25.

-Step ST25-

The abnormality determination section 440 integrates the evaluation results of the execution level of the involuntary function, which is detected by the involuntary function detection section 420, the execution level of the predictive function, which is detected by the predictive function detection section 431, and the execution level of the base function, which is detected by the base function detection section 435, to determine the driver abnormality. That is, the abnormality determination section 440 determines whether to switch the vehicle A to the automated driving. Here, for example, (1) in the case where both of the periodicity characteristic amount (the head behavior) and the saccade amplitude (the sightline behavior) in the involuntary function are fault or (2) in the case where the four or more evaluation items are fault, the abnormality determination section 440 determines that the driver is abnormal (FAULT in step ST25), and execute control to switch to the automated driving (step ST26).

In the example illustrated in FIG. 24, in regard to the involuntary function, only the saccade amplitude is fault, which makes the two fault items among the evaluation items. Thus, it is determined "OK" in step ST25, and the processing flow proceeds to step ST28.

-Step ST28-

The abnormality determination section 440 relaxes the determination criteria, which are used to determine the driver abnormality, to facilitate the determination of the driver abnormality. That is, even in the state where the driver abnormality is not determined in the normal time, the driver abnormality is determined early. The determination criterion to be changed is not particularly limited. The determination criteria for the execution level of the involuntary function may be changed, or the determination criteria for the execution level of the driving function (the base function and/or the predictive function) may be changed. Here, in addition to the relaxation of the conditions in step ST38 described above, (1) in regard to the execution level of the base function, the steering operation deviation degree is further relaxed from "fault at 0.35 [deg] or larger" to "fault at 0.3 [deg] or larger", and (2) in regard to the execution level of the predictive function, the evaluation criterion for the distance from the obstacle is relaxed from "fault with the risk value being Y or higher" to "fault with the risk value being Y-$\beta$ ($\beta$ is a positive number) or higher". When the processing in step ST28 is terminated, the processing flow returns to step ST21.

-Step ST21-

When the processing flow returns to step ST21, the recognition result of the vehicle driving scene by the driving scene recognition section 210 is updated. In addition, the abnormality determination section 440 refers to the sensor table in the storage section 300, and selects the abnormality determination sensor that corresponds to the updated driving scene. It is assumed that the driving scene of the vehicle remains in the period T13.

-Step ST22-

In FIG. 24, the driving scene in the period T13 is the driving scene in which the driving function must be executed. Thus, it is continuously determined "YES" in step ST22, and the processing flow proceeds to step ST24.

-Step ST24-

As described above, the abnormality determination section 440 determines the driver abnormality based on the determination items and the determination criteria in FIG. 24. Here, it is continuously determined that the "fault item is present", and the processing flow proceeds to next step ST25.

-Step ST25-

As described above, the abnormality determination section 440 integrates the evaluation results of the execution level of the involuntary function, the execution level of the predictive function, and the execution level of the base function to determine the driver abnormality. Here, it is assumed that the fault evaluation items are increased to four (see the rightmost column in FIG. 24). In this case, it is determined "FAULT" in step ST25, and the processing flow proceeds to step ST26.

-Step ST26-

The abnormality determination section 440 instructs the travel control section 500 to make the vehicle automatically evacuate to the evacuation position (for example, the road shoulder) for the stop. As a result, the vehicle A is controlled by the travel control section 500, makes evacuation travel to the road shoulder, and stops at the evacuation position.

As it has been described so far, according to this embodiment, the vehicle control system 1 includes: the sensor group including the abnormality determination sensor (including the driving operation sensor 66 and the driver state sensor 67); the driving scene recognition section 210; the storage section 300 that stores the sensor table presenting the relationships between the driving scene of the vehicle recognized by the driving scene recognition section 210 and the abnormality determination sensor; and the abnormality determination section 440 that refers to the sensor table to determine the driver abnormality on the basis of the output of the abnormality determination sensor corresponding to the driving scene of the vehicle A recognized by the driving scene recognition section 210. The vehicle control system 1 is an example of the driver abnormality determination system.

In the above embodiment, the example in which the involuntary function detection section 420 and the driving function detection section 430, each of which detects the sign of the abnormality on the basis of the detection data by the abnormality determination sensor, are provided and the abnormality determination section 440 integrates the detection results of the involuntary function detection section 420 and the driving function detection section 430 to determine the driver abnormality has been described. That is, in this embodiment, the example in which the detection section is provided per function of the driver to detect the sign of the abnormality and is integrated to determine the driver abnormality has been described. However, when the driver abnormality is determined, such a method by dividing the detection section per function may not be used. That is, the abnormality determination section 440 may be configured to receive the driving scene of the vehicle, which is recognized by the driving scene recognition section 210, and the detection result from each of the sensors constituting the above-described sensor group. Then, the abnormality determination section 440 may refer to the sensor table in the storage section 300, and may determine the driver abnormality based on the output of the abnormality determination sensor that is selected from the sensor group in accordance with the driving scene of the vehicle, which is recognized by the driving scene recognition section 210. Also, in this case, the similar effects to those in the above embodiment can be obtained.

The following description relates to a computer environment in which embodiments of the present disclosure may be implemented. This environment may include an embedded computer environment, local multi-processor embodiment, remote (e.g., cloud-based) environment, or a mixture of all the environments.

Figure 25:
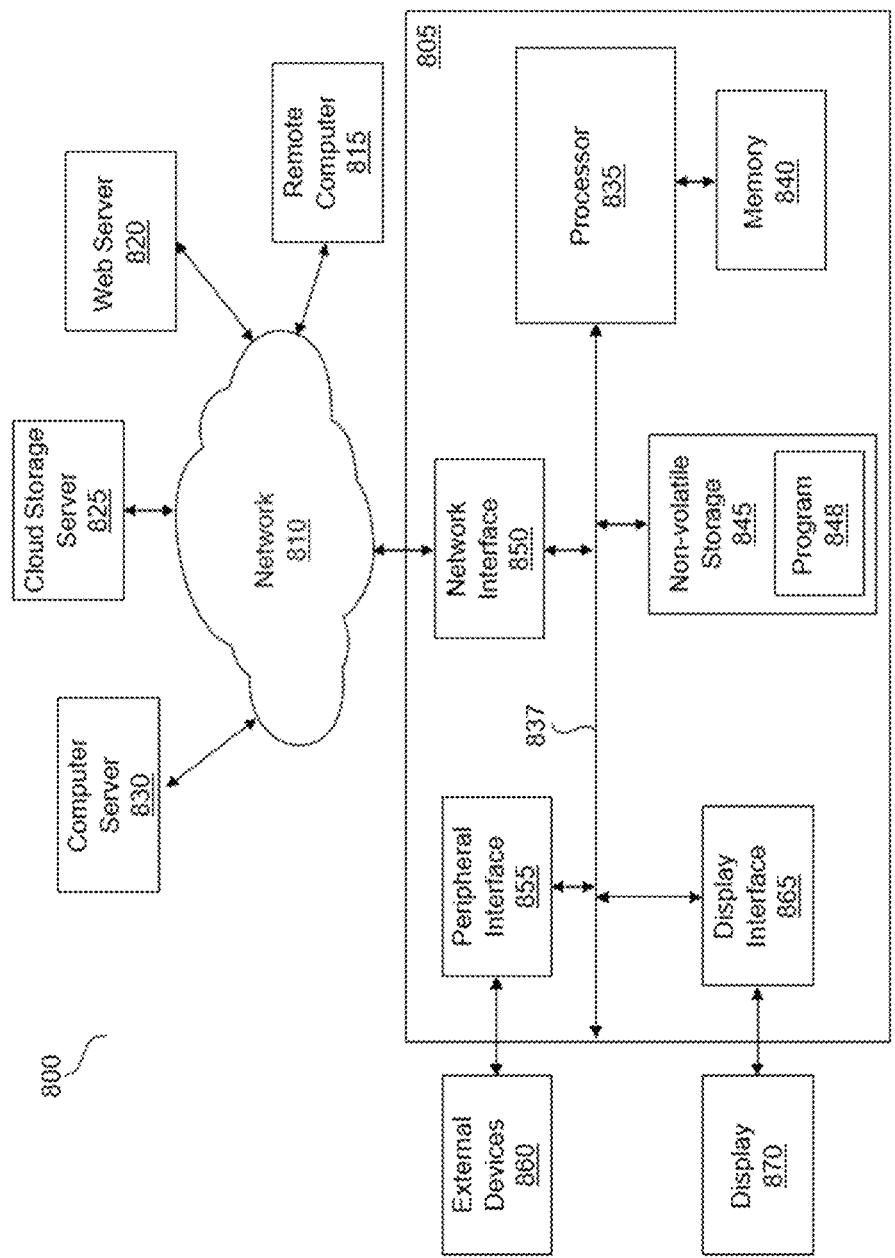
FIG. 25 is a block diagram of computer-based circuitry that may be used to implement control features of the present disclosure.

FIG. 25 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 25 is a functional block diagram illustrating a networked system 800 of one or more networked computers and servers. In an embodiment, the hardware and software environment illustrated in FIG. 25 may provide an exemplary platform for implementation of the software and/or methods according to the present disclosure.

Referring to FIG. 25, a networked system 800 may include, but is not limited to, computer 805, network 810, remote computer 815, web server 820, cloud storage server 825 and computer server 830. In some embodiments, multiple instances of one or more of the functional blocks illustrated in FIG. 25 may be employed.

Additional detail of computer 805 is shown in FIG. 25. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be built into the automobile, a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include input devices, e.g., any or all of the devices in the information acquisition means 10 and/or other suitable input devices, and output devices, e.g., any or all of the various actuator devices AC and/or other suitable output devices, e.g., a speaker. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870, e.g., a head-up display or a screen of a car navigation system. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

DESCRIPTION OF REFERENCE SIGNS AND NUMERALS

A: Vehicle
1: Vehicle control system (driver abnormality determination system)
66: Driving operation sensor
210: Driving scene recognition section
300: Storage section
440: Abnormality determination section
800: Networked system
805: Computer
810: Network
815: Remote computer
820: Web Server
825: Cloud storage server
830: Computer server
835: Processor
837: Bus
840: Memory
845: Non-volatile storage
848: Program
850: Network interface (wireless)
855: Peripheral Interface
860: External devices
865: Display interface
870: Display

The invention claimed is:

1. A driver abnormality determination system for determining abnormality of a driver who drives a vehicle, the driver abnormality determination system comprising:
circuitry configured to:
detect a driving operation by the driver;
detect behavior of a head of the driver and motion of eyeballs and/or movement of a sightline of the driver; and
recognize a driving scene in which the vehicle is driven; and a memory that stores a sensor table of a relationship between the driving scene of the vehicle, and detected values to be used to determine a driver abnormality;

wherein the circuitry is configured to determine the driver abnormality based on the sensor table, the driving scene, the driving operation and the behavior, and wherein the sensor table includes a first column describing possible driving scenes of the vehicle and a second column of sensors providing the detected values used to determine the driver abnormality.

2. The driver abnormality determination system according to claim 1, wherein, to recognize the driving scene the circuitry is configured to receive external environmental information from at least one of an external camera, radar, a position sensor, and a vehicle behavior estimator.

3. The driver abnormality determination system according to claim 2, wherein the circuitry is configured to process an image from the external camera to: generate map data; acquire information regarding objects near the vehicle; and recognize an on-road obstacle among the objects in a path of the vehicle.

4. The driver abnormality determination system according to claim 3, wherein, to detect the behavior, the circuitry is configured to receive behavior data from an in-vehicle camera and, to detect the driving operation, the circuitry is configured to receive data from at least one of an acceleration sensor, a steering angle sensor, and a brake pressure sensor.

5. The driver abnormality determination system according to claim 2, wherein, to detect the behavior, the circuitry is configured to receive behavior data from an in-vehicle camera and, to detect the driving operation, the circuitry is configured to receive data from at least one of an acceleration sensor, a steering angle sensor, and a brake pressure sensor.

6. The driver abnormality determination system according to claim 1, wherein the circuitry is configured to process an image from an external camera to: generate map data; acquire information regarding objects near the vehicle; and recognize an on-road obstacle among the objects in a path of the vehicle.

7. The driver abnormality determination system according to claim 6, wherein, to detect the behavior, the circuitry is configured to receive behavior data from an in-vehicle camera and, to detect the driving operation, the circuitry is configured to receive data from at least one of an acceleration sensor, a steering angle sensor, and a brake pressure sensor.

8. The driver abnormality determination system according to claim 1, wherein, to detect the behavior, the circuitry is configured to receive behavior data from an in-vehicle camera and, to detect the driving operation, the circuitry is configured to receive data from at least one of an acceleration sensor, a steering angle sensor, and a brake pressure sensor.

9. A driver abnormality determination method for determining abnormality of a driver who drives a vehicle, the method comprising:

detecting a driving operation by the driver;

detecting behavior of a head of the driver and motion of eyeballs and/or movement of a sightline of the driver;

recognizing a driving scene in which the vehicle is driven;

storing a sensor table of a relationship between the driving scene of the vehicle and detected values to be used to determine a driver abnormality; and determining the driver abnormality based on the sensor table, the driving scene, the driving operation and the behavior, wherein the sensor table includes a first column describing possible driving scenes of the vehicle and a second column of sensors providing the detected values used to determine the driver abnormality.

10. A non-transitory computer readable storage including computer readable instructions that when executed by a controller cause the controller to execute a driver abnormality determination method for a driver in a vehicle, the method comprising:

detecting a driving operation by the driver;

detecting behavior of a head of the driver and motion of eyeballs and/or movement of a sightline of the driver;

recognizing a driving scene in which the vehicle is driven;

storing a sensor table of a relationship between the driving scene of the vehicle and detected values to be used to determine a driver abnormality; and determining the driver abnormality based on the sensor table, the driving scene, the driving operation and the behavior, wherein the sensor table includes a first column describing-possible driving scenes of the vehicle and a second column of sensors providing the detected values used to determine the driver abnormality.

* * * * *